(12) United States Patent
Nakahara et al.

(10) Patent No.: US 6,848,102 B2
(45) Date of Patent: Jan. 25, 2005

(54) PROCESS EXECUTING METHOD AND RESOURCE ACCESSING METHOD IN COMPUTER SYSTEM

(75) Inventors: Masahiko Nakahara, Yokohama (JP); Masaaki Iwasaki, Tachikawa (JP); Tadashi Takeuchi, Yokohama (JP); Takahiro Nakano, Yokohama (JP); Kazuyoshi Serizawa, Hadano (JP); Shihoko Taguchi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 677 days.

(21) Appl. No.: 09/838,767

(22) Filed: Apr. 20, 2001

(65) Prior Publication Data

US 2002/0049802 A1 Apr. 25, 2002

Related U.S. Application Data

(62) Division of application No. 08/917,477, filed on Aug. 26, 1997, now Pat. No. 6,253,225.

(30) Foreign Application Priority Data

Aug. 28, 1996 (JP) .............................. 8-226404
Dec. 6, 1996 (JP) .............................. 8-326499

(51) Int. Cl.[7] ................................. G06F 9/46
(52) U.S. Cl. .................... 718/104; 718/100; 718/102
(58) Field of Search ............................... 718/100, 102, 718/104

(56) References Cited

U.S. PATENT DOCUMENTS

| | | | |
|---|---|---|---|
| 4,787,083 A | | 11/1988 | Tanaka .......................... 370/85 |
| 5,247,675 A | | 9/1993 | Farrell et al. ................ 395/650 |
| 5,414,848 A | | 5/1995 | Sandage et al. ............. 395/650 |
| 5,421,012 A | * | 5/1995 | Khoyi et al. ................. 718/107 |
| 5,428,525 A | | 6/1995 | Cappelaere et al. ......... 364/140 |
| 5,428,761 A | | 6/1995 | Herlihy et al. ............... 395/425 |
| 5,469,556 A | * | 11/1995 | Clifton ......................... 711/163 |
| 5,553,267 A | | 9/1996 | Herlihy ......................... 395/474 |
| 5,566,177 A | | 10/1996 | Bhandari et al. ........... 370/85.5 |
| 5,586,289 A | * | 12/1996 | Chin et al. .................... 711/111 |
| 5,586,318 A | | 12/1996 | Toutonghi ..................... 709/107 |
| 5,784,618 A | | 7/1998 | Toutonghi ..................... 709/107 |
| 5,802,590 A | * | 9/1998 | Draves ......................... 711/164 |
| 5,812,844 A | | 9/1998 | Jones et al. ................... 709/104 |
| 5,925,096 A | | 7/1999 | Hlasnik et al. .............. 709/103 |
| 5,963,142 A | * | 10/1999 | Zinsky et al. ............... 340/5.74 |

* cited by examiner

Primary Examiner—Majid A. Banankhah
(74) Attorney, Agent, or Firm—Antonelli, Terry, Stout & Kraus, LLP

(57) ABSTRACT

A process executing method capable of performing multi-processing by using a shared resource without impairing periodical drivability of processes designed for executing continuous media processing. When a process requests the use of the shared resource, abortion of that process is first disabled by the process itself by using an abort disable function and then preemption of the same process is disabled by means of a preempt control module, whereupon the process enters a processing executed by using the shared resource. Upon completion of the processing for the shared resource, the process is immediately set to a preempt-enabled state by means of a preempt control module. After completion of all the processings, the abort-disabled state is finally cleared by using a disabled-abort clear function. Upon occurrence of forcive termination of a process in the abort-disabled state thereof, execution of this process is continued until the abort-disabled state is cleared, and the process is terminated forcibly after the abort-disabled state has been cleared.

18 Claims, 18 Drawing Sheets

FIG. 2A

| RESOURCE IDENTIFIER | FLAG INDICATING PRESENCE / ABSENCE OF NEXT RESOURCE MANAGEMENT DATA | POINTER TO NEXT RESOURCE MANAGEMENT DATA | PROCESS MANAGEMENT DATA POINTER | RESOURCE POINTER |
|---|---|---|---|---|
| RID | F-RID | P-RID | P-PID | ADDRESS |
| 201 | 202 | 203 | 204 | 205 |

| PROCESS IDENTIFIER | FLAG INDICATING PRESENCE / ABSENCE OF NEXT PROCESS MANAGEMENT DATA | POINTER TO NEXT PROCESS MANAGEMENT DATA |
|---|---|---|
| PID | F-PID | P-PID |
| 207 | 208 | 209 |

107

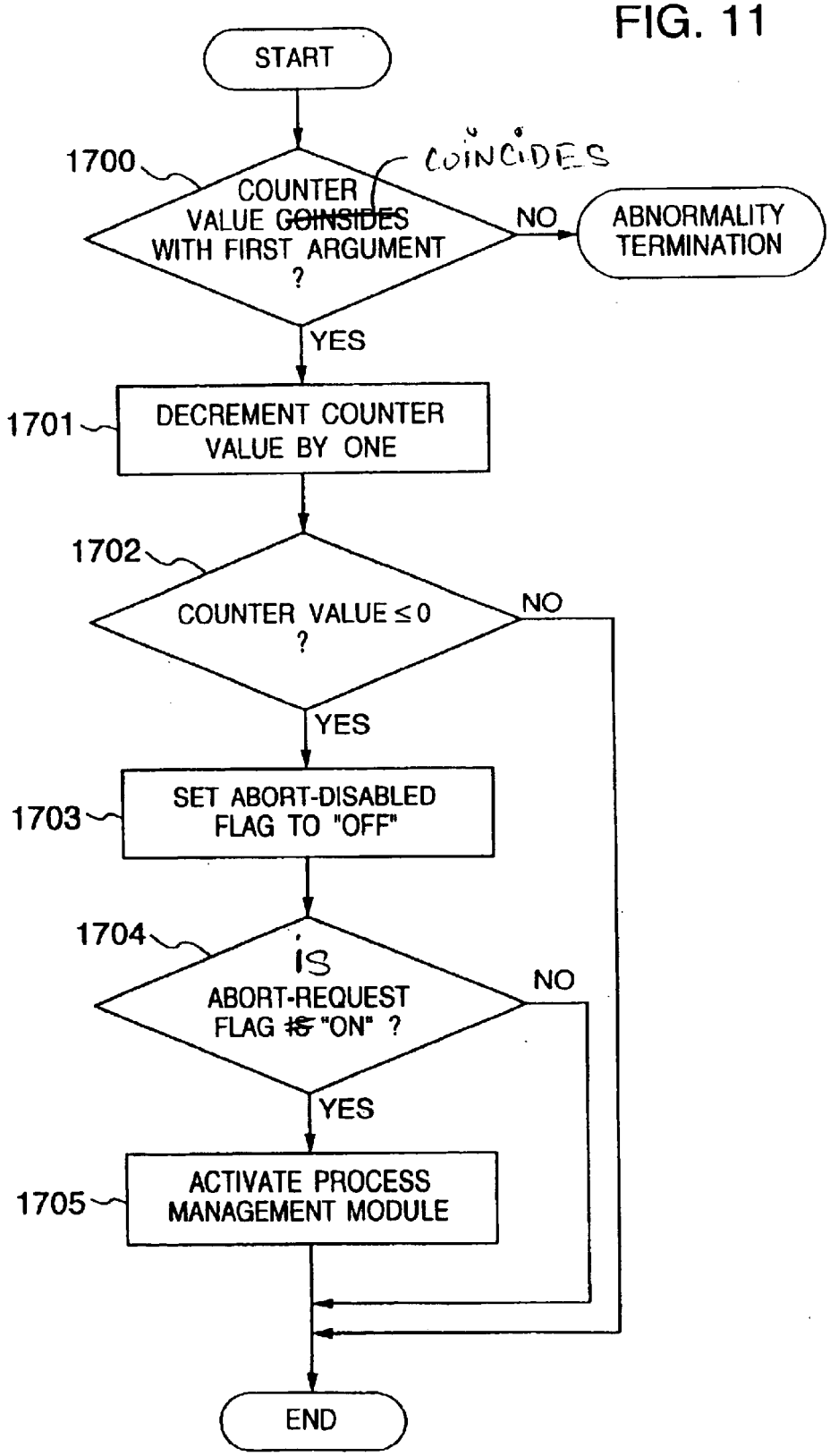

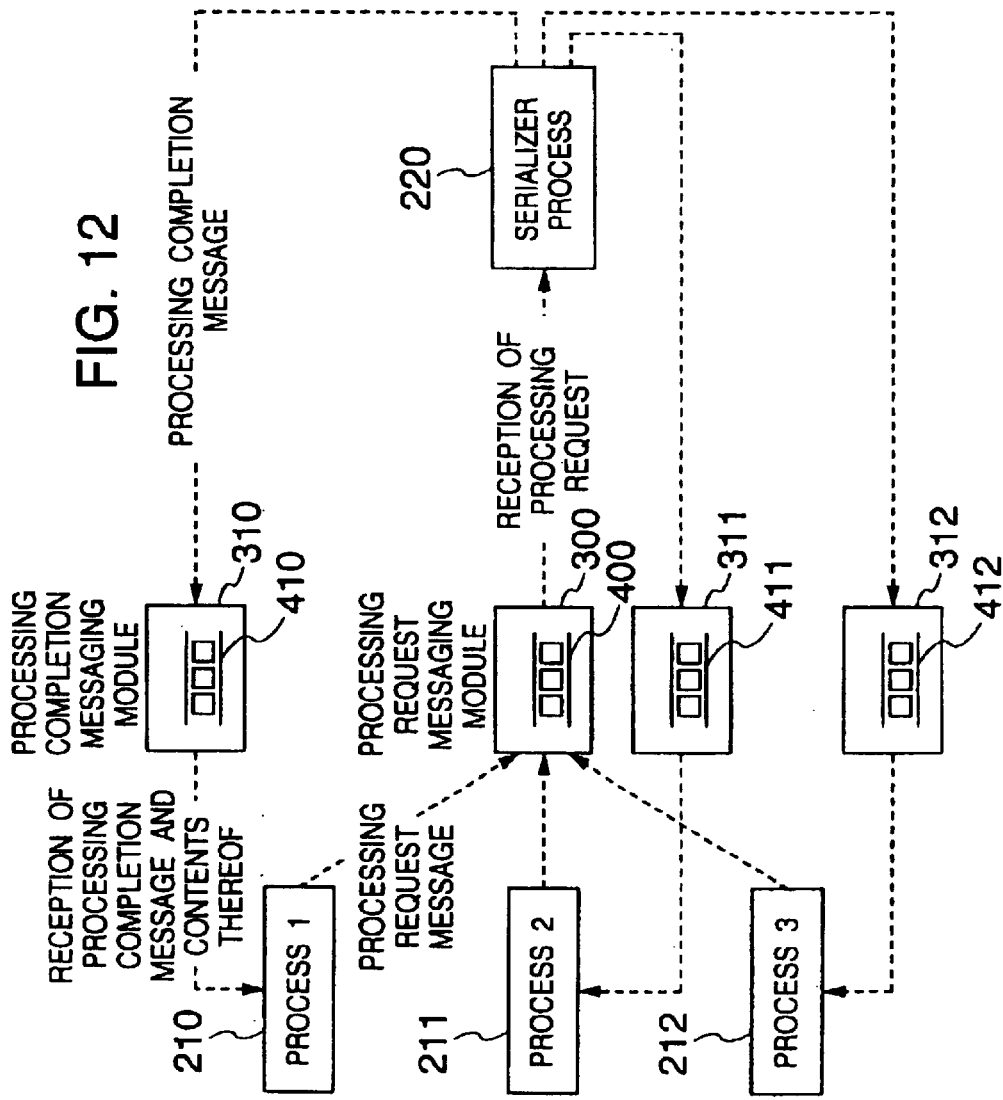

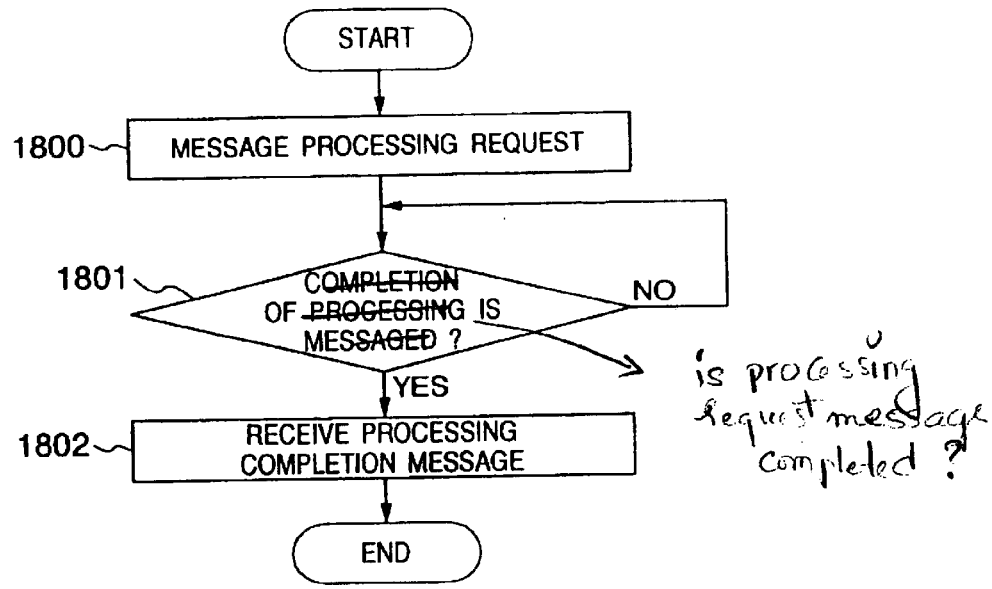
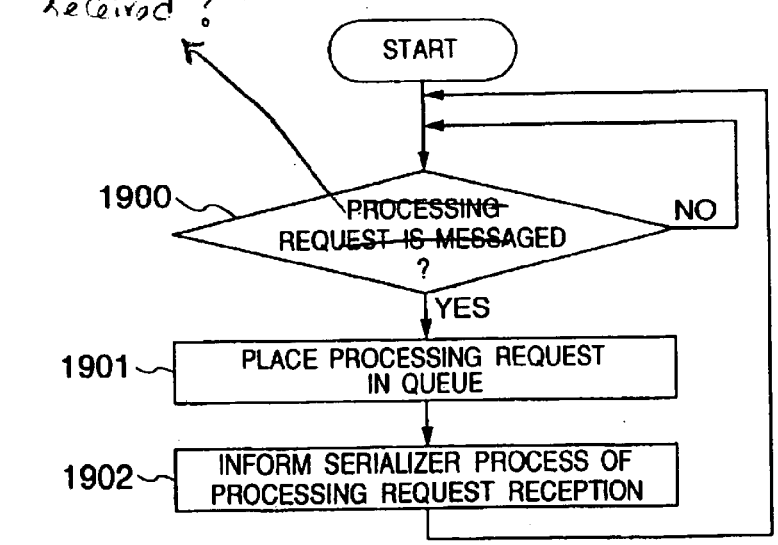

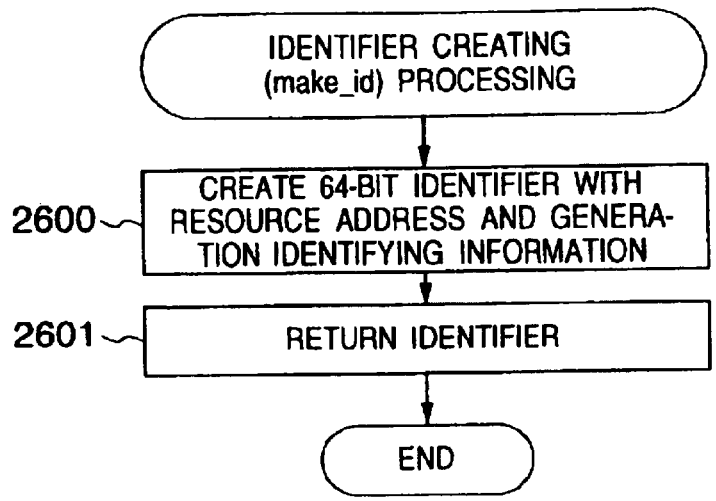
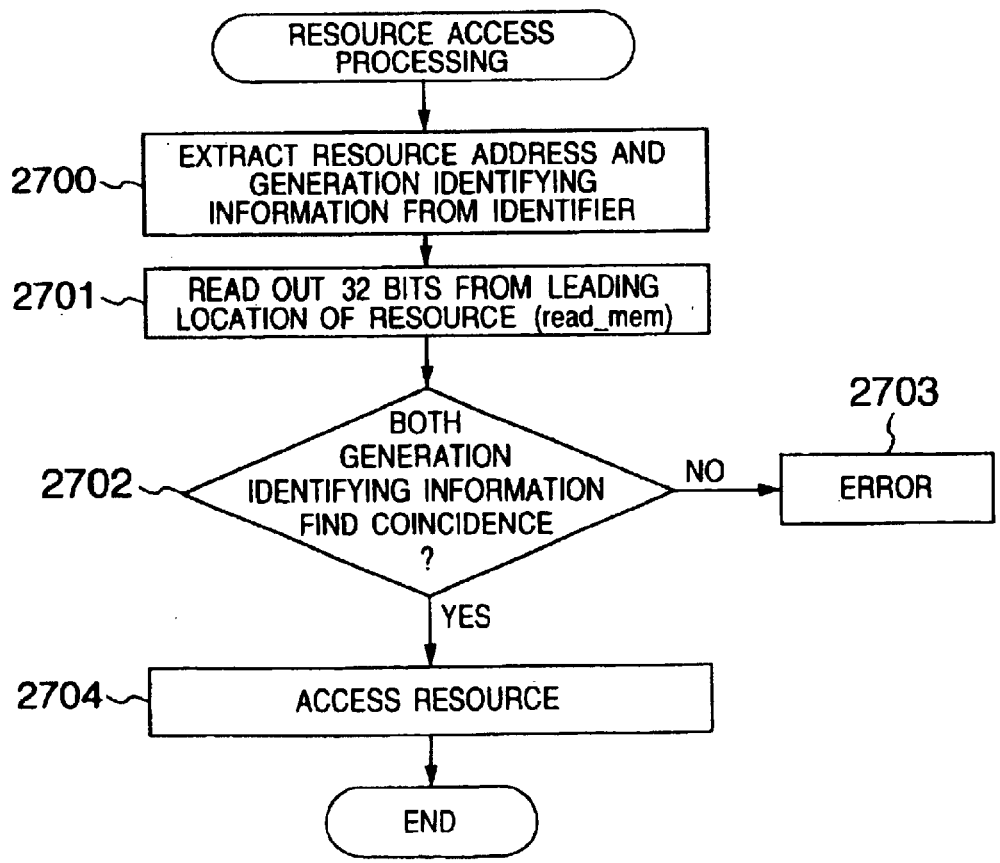

PROCESS EXECUTING METHOD AND RESOURCE ACCESSING METHOD IN COMPUTER SYSTEM

CROSS-REFERENCE TO RELATED APPLICATION

This application is a Divisional of U.S. application Ser. No. 08/917,477, filed Aug. 26, 1997, now U.S. Pat. No. 6,253,225.

BACKGROUND OF THE INVENTION

The present invention relates to a method of executing processes in an operating system controlling a computer system and a method of accessing a resource in the computer system. More particularly, the invention is concerned with a method of executing processes by using a shared resource in an operating system providing a multi-processor or multi-processing environment.

In the operating system capable of providing the multi-processing environment for executing a plurality of processes (or tasks) in parallel on a time-division basis, it is required to execute the processes while performing mutual exclusive control or management so that the resource shared among the processes is not simultaneously allocated to a plurality of processes. As a means for realizing such mutual exclusive management, there is known and widely adopted in the operating system (OS) a procedure referred to as "lock control".

In the lock control, a flag indicating that a corresponding shared resource is being used is set for each of the shared resources. When one of the processes is going to perform a processing by using a given one of the shared resources, it is checked whether the flag corresponding to this shared resource is set by any other process. Unless the flag is set by the other process, the given one process can use exclusively the shared resource while setting the flag indicating that the resource is occupied. This operation is typically referred to as "lock or locking" of the shared resource. Upon completion of the processing for the shared resource, the process releases the shared resource while resetting the flag. This operation is referred to as "unlock or unlocking" of the shared resource. On the other hand, when the flag corresponding to the shared resource to be used is set by any other process, the operating system sets the one process requesting the use of this resource to the waiting or standby state until that shared resource has been unlocked.

At this juncture, let's assume that a process 1 of low priority and a process 2 of high priority are executed in parallel and that a shared resource A is shared availably by these two processes. On this assumption, it is further supposed that the process 1 of low priority has locked the shared resource A in the course of using a CPU (central processing unit) and that the shared resource A has entered into a suspended state with the lock being left validated. In that case, the process 2 of high priority assigned with the right for using the CPU in succession to the process 1 can not use the shared resource A, because the resource has been locked by the process 1 of low priority. As a consequence, execution in succession becomes impossible.

The problem that the process of high priority is inhibited from execution in succession because of the lock secured by the process of low priority is referred to as the priority inversion problem. Concerning this priority inversion problem, reference may be made to "PRIORITY INHERITANCE PROTOCOLS: AN APPROACH TO REAL-TIME SYNCHRONIZATION" in IEEE TRANSACTIONS ON COMPUTERS, Vol. 39, No. 9, September 1990, pp. 1175–1185. In the conventional operating system known heretofore, when the priority inversion takes place, the dormant process of low priority acquired and locked the shared resource is executed with the topmost priority in order to unlock the shared resource so that the process of high priority can be executed as early as possible.

On the other hand, the operating system providing the multiprocessing environment is imparted with a function for protecting the resource allocated to a given process against the illegal access attempted by any other process. This function is referred to as the access right control or manage function. The access right control or management now under consideration is based on the presumption that the access right can be set on a process-by-process basis and that a plurality of processes may simultaneously try to access a computer resource. An interface for allowing a user application to call the functions of the operating system is ordinarily provided and known as "system call". In this conjunction, it is noted that when a pointer is used as an argument of the system call, designation of an illegal address by the user application may unfavorably lead to destruction of important data resident in the operating system. To avoid such unwanted situation, an identifier is used as the argument in place of the pointer in typical one of the access right control or management.

In the case of the access right control method in which the identifier is used as the argument in the system call issued by the user application, the operating system is required to translate the identifier to an address in the resource for making access to the resource. In this context, the simplest one of the translation methods is a method in which the hash function is employed. According to this method, an identifier is placed in or assigned to the hash function as a key, whereon the hash value as obtained is used as the address. The access right control method relying on the hash function will be described below.

§1. Configuration

As is shown in FIG. 1, the operating system assigns a resource identifier 100 to the hash function (F) 101 as a key to acquire as the hash value an index "Index" 102 contained in a resource management data table 104. As is shown in FIG. 2A, resource management data 105 stored in the resource management data table 104 contains an identifier 201, a pointer 205 to a resource 103, a flag 202 indicating presence or absence of a succeeding or next resource management data 106, a pointer 203 to the succeeding resource management data 106, and a pointer 204 to process management data 107.

There may arise such situation that the hash function returns a same index "Index" for different identifiers RID. In that case, collision between the indexes "index" will occur. Accordingly, the second resource management data 106 et seq. are stored in an overflow area with the address of the second or succeeding resource management data 106 being placed in the immediately preceding resource management data 105.

In case the resource is a shared resource, there exist a plurality of processes having respective access rights for the same identifier RID. In that case, the pointers to the second process identifier data 108 et seq. are placed in the immediately preceding process management data 107.

The resource management data 105 is shown in FIG. 2A while the process management data 107 is shown in FIG. 2B. As can be seen in FIG. 2B, the process management data 107 is composed of a process identifier 207, a flag 208 indicating presence or absence of the next process management data, and a pointer 209 to the next process management data. At the end of the user application, it becomes necessary to know the identifier of the process having the access right in order to deallocate the resource occupied by the process. Thus, the operating system is provided with a process-specific resource identifier list 109 in which a resource identifier 110 is entered every time when a corresponding resource is generated or every time the access right to the shared resource is acquired.

§2. Resource Allocation Processing

FIG. 3 is a flow chart for illustrating a resource allocation processing.

When the system call requesting the resource allocation is issued to the operating system by a user application, the operating system responds thereto by allocating the resource (step 1000). Subsequently, the operating system acquires an identifier RIDx definite in the system (step 1001) and places the identifier RIDx to the hash function as a key. Thus, the index "Index" contained in the resource management data table 104, i.e., the address where the resource management data x is stored is obtained (step 1002). In the case where the resource management data y has already been placed at the leading location of the area designated by the index, i.e., when collision between the indexes occurs (step 1003), the pointers are followed up from one to another (step 1005) so long as the flag 202 indicating presence or absence of the identifier management data 105 assumes a value "ON" (indicating the presence of the resource management data 105) (step 1004). When the resource management data z for which the flag 202 indicating the presence or absence of the succeeding identifier management data is set to "OFF" is found in the course of following or tracing the pointers, then the succeeding identifier management data presence/absence flag 202 is set to "ON" (step 1006). Subsequently, an area for the new resource management data x is allocated to the overflow area (step 1007), whereupon the pointer 203 to the immediately preceding resource management data contained in the resource management data y is placed at the address of the resource management data x (step 1008). When it is found in step 1003 that the succeeding identifier management data is not stored, the area for the resource management data x is assigned to the main area (step 1009).

The process management data 107 is placed in the process management area and the process identifier is stored therein (step 1010). At the same time, the identifier RIDx 207 is stored in the process-specific identifier list 109 (step 1011). The identifier RIDx 201, the pointer 204 to the process management data and the resource pointer 205 contained in the resource management data x 105 are assigned with respective values, whereon the flag 202 indicating the presence or absence of the succeeding resource management data is set to "OFF" state (step 1012). Then, the identifier RIDx is returned to the user application (step 1013).

§3. Resource Access Processing

When the system call indicating a resource access request is issued by the user application to the operating system, the latter executes the processing illustrated in FIG. 4.

The operating system assigns the identifier RIDx which is the argument of the system call to the hash function to obtain the index of the resource management data 105 (step 1100). Subsequently, the identifier RID contained in the resource management data 105 located at the index is compared with the argument RIDx (step 1101). When the values of the identifier RID and the argument RIDx differ from each other and when the flag 202 indicating the presence or absence of the succeeding resource management data in the resource management data 105 is set "ON", i.e., when the succeeding resource management data 105 exists (step 1102), the pointer 203 is followed up to the succeeding resource management data (step 1103), wherein the comparison between the identifier and the argument mentioned above is again performed (step 1101). In the case where the identifiers RID of all the resource management data 105 which can be followed with the pointers do not coincide with the argument RIDx, it is then decided that the resource as requested does not exist in the system whereupon an error message is returned to the user application (step 1104). On the other hand, when coincidence is found between the identifier RID contained in the resource management data 105 and the argument RIDx in the comparison step 1101, then the process identifier PIDx of the process accessing currently the resource is compared with the process identifier PID 207 contained in the process management data 107 (step 1105). When it is found in step 1105 that the values of both the identifiers differ from each other and when the flag 208 contained in the process management data 107 and indicating the presence or absence of the succeeding process management data is "ON" (indicating that the succeeding process management data 107 exists) (step 1106), the succeeding pointer 209 is followed to reach the succeeding process management data (step 1107), whereon the comparison of the process identifiers mentioned above is again performed (step 1105). When the process identifiers PID contained in all the resource management data 105 which can be followed with the aid of the pointers do not coincide with the argument PIDx, it is then decided that the user application issuing the system call has no access right to the resource, wherein an error message is returned to the user application (step 1108).

On the other hand, when the coincidence is found between the process identifier and the argument in step 1105, access to the resource is performed by using the resource address stored in the resource pointer 205 contained in the resource management data 105 (step 1109).

§4. Resource Deallocation Processing

In the case where a system call requesting the deallocation of the resource is issued to the operating system from the user application, then the resource deallocation processing is performed for that resource. Additionally, when deallocation of the resources becomes necessary due to abnormal termination of a process, then the resource deallocation processing is performed for the resources corresponding to all the identifiers contained in the identifier list specific to the process terminated abnormally. The resource deallocation processing will be described below by reference to FIG. 5. In the first place, the operating system inhibits or block the access to all the resources (step 1200) and places the identifier RIDx of the resource to be deallocated in the hash function as a key to obtain the index "Index" of the resource management data 105 (step 1201). Subsequently, the identifier RID contained in the resource management data 105 stored in the area indicated by the index is compared with the key or identifier RIDx (step 1202). When the values of both the identifiers differ from each other and when the flag 202 indicating the presence or absence of the succeeding resource management data is "ON", i.e., when the succeeding resource management data 105 exists (step 1203), the pointer 203 is followed up to the succeeding resource management data (step 1204), whereon the identifier comparison mentioned above is again repeated (step 1202). In case the identifiers RID of all the resource management data 105 which can be followed with the pointers do not coincide with the key or identifier RIDx, it is then decided that the resource as requested does not exist, whereupon an error message is returned to the user application (step 1205).

On the other hand, when coincidence between both the identifiers RID and RIDx is found in step 1202, the address of the process management data 107 stored in the pointer 204 to the process management data is acquired (step 1206). When the succeeding resource management data 105 exists (step 1207), the resource management data 105 specified by the identifier RIDx is released or unlocked (step 1209) after changing the string of the pointers 203 to the resource management data (step 1208). Subsequently, the pointer acquired in step 1206 is followed and it is checked whether or not the flag contained in the process management data 107 and indicating the presence or absence of the succeeding process management data is "ON" (step 1210). If the flag is "ON", the pointer 209 to the succeeding process management data is acquired (step 1211), whereupon a message indicating that the process management data 107 is released or deallocated and that the identifier RID can no more used is issued to the user applications, i.e., individual processes (step 1212). On the other hand, when it is dedicated in step 1210 that the flag 208 indicating the presence or absence of the succeeding resource management data is "OFF", the final process management data 107 is released or deallocated, wherein the message indicating that the identifier RID can no longer be used is issued to the user application (step 1213), which is then followed by the reopening of the access to all the resources (step 1214).

In conjunction with the method described above, it is noted that even when the index "Index" contained in the resource management data table 104 can be obtained by assigning an illegal identifier RIDz to the hash function as the key, the illegal identifier RIDz can not be found in the resource management data 105 which can be followed or traced with the index. Consequently, no resource address can be obtained, rendering the access impossible. Further, even if the illegal identifier RIDz should be contained accidentally in the resource management data 105 traced with the index, the identifier of the process making access to the resource is not stored in the process management data 107. Consequently, the address of the resource can not be gained. Thus, illegal access can be inhibited or disabled.

Furthermore, in the resource unlock processing, the resource protection can be realized by inhibiting or disabling all the accesses of the user applications to the resource, while illegal access after the resource deallocating can be inhibited by invalidating the identifier, releasing the resource management data and the process management data which can be traced with the index and issuing the message informing the processes of the deallocating of the resource.

SUMMARY OF THE INVENTION

In the continuous media processing, operation of a process for processing data such as animation data is accompanied with periodicity. A process scheduling method making use of this feature has already been proposed. For more particulars of this method, reference may be made to Japanese Patent Application No. 8-73673.

In this conjunction, it is noted that the priority inversion problem discussed hereinbefore affects adversely the process scheduling method based on the periodicity mentioned above as well. By way of example, it is assumed that there exist two processes, namely process 1 and process 2, for carrying out the continuous media processing and that there exists a resource A which is shared by these two processes. In that case, when the process 1 and the process 2 attempt to control or manage mutually exclusively the shared resource A by making use of the lock function, there may arise the priority inversion problem, which will impair the periodical drivability of the process.

Further important problem incurred by the priority inversion can be seen in that the process having been locked, bringing about the priority inversion problem, is scheduled with highest preference. Thus, it is safe to say that the priority inversion problem exerts adverse influence even to the periodical drivability of other process partaking in the continuous media processing.

Under the circumstances, in the system designed for performing the continuous media processing, there is conceivable a method of structuring a computer system without using any lock at all from the beginning in order to evade the priority inversion problem. As a method of realizing the exclusive control or mutually exclusive management of the process, such process control or management method may be conceived in which the process using currently the shared resource is allowed to occupy exclusively the CPU (Central Processing Unit) or, to say in another way, any other process is inhibited or disabled from being scheduled so long as the shared resource is being used by a given one of the processes. Such control or managing method can be realized by adopting a preempt control method proposed in Japanese Patent Application No. 8-97997. Parenthetically, the preempt control method concerns prevention of a process being executed from being temporarily suspended (i.e., preempted) by providing interfaces "preempt disabling" and "disabled-preempt releasing or clearing", wherein during a period intervening between a time point at which the preempt disabling is validated and a time point at which the preempt disabling is cleared (this period may also be referred to as the preempt-disabled interval), the process in execution is prevented from being preempted and thus can continue the execution even when a scheduling request is issued from any other process. By virtue of such control, it can be ensured that no more than one process can use the shared resource at any time. In other words, the exclusive control or management of the processes can thus be realized.

It is however noted that with the control method mentioned above, periodical drivability of the other process may be impaired when the process using the shared resource runs over a prolonged duration.

Let's consider, for example, a processing for extracting a resource from a free list in which usable resources shared in the system are queued, initializing the resource as extracted and chaining it to a resource allocation list of a given process. In that case, the shared resources which need the mutually exclusive control or management are the free list and the resource allocation list.

When the processing mentioned above is to be realized only by setting the preempt-disabled interval, it is then necessary to set the preempt-disabled interval so that it extends from a time point "preceding to contacting the free list" to a time point at which "the resource has been chained to the resource allocation list". To this end, processings (1a) to (5a) mentioned below will have to be carried out.

(1a) Setting the preempt-disabled state.
(2a) Taking out the resource from the free list.
(3a) Initialization of the resource.
(4a) Chaining the resource to the resource allocation list for the processes.
(5a) Clearing the preempt-disabled state as set.

At this juncture, it is noted that the time taken for initialization of the resource is not always short. In fact, time in the order of several ten milliseconds is taken solely for the initialization of a memory upon memory allocation internally of the operating system. Accordingly, when the mutually exclusive control is to be realized only by setting the preempt-disabled interval, as mentioned above, there may arise such situation that a given one process occupies the CPU for an extended time, which will result in degradation in the response performance on the real-time basis, eventually exerting adverse influence to the periodical drivability of the continuous media processing.

As the means for coping with the above problems, the processings mentioned above may be modified or rearranged as follows:

(1b) Setting the preempt-disabled state.
(2b) Taking out the resource from the free list.
(3b) Clearing the preempt-disabled state as set.
(4b) Initializing the resource.
(5b) Setting the preempt-disabled state.
(6b) Chaining the resource to the resource allocation list for the processes.
(7b) Clearing the preempt-disabled state as set.

The above processings can certainly satisfy the necessary condition from the view point of the mutual exclusive control or management. Besides, the duration of the preempt-disabled interval can be reduced to ca. 10 $\mu$sec., while in the resource initialization processing (4b), the right of using the CPU can be transferred to other process. Thus, the real-time response performance of the system can be improved. Unfavorably, however, there may arise a problem when the process executing the resource initialize processing (4b) is externally forced to terminate in the course of executing this processing.

In general, most of computer systems are equipped with a function for stopping externally process execution for coping with overrunning of a program. Accordingly, when the process executing the processings mentioned above is forced to terminate by other process by resorting to the forcive terminate function mentioned above, then the resource initialized by the processing (4b) may become a free resource belonging to none of the management lists. As the result of this, such situation may arise in which the operating system can not recover the resource when the process is terminated, which in turn means that the resource used by the process terminated forcibly becomes unusable for ever. In order to evade this problem, there may be conceived a method of initializing the resource in the state where the resource is chained to the free list or the resource allocation list. In that case, however, the duration of the preempt-disabled interval period is substantially equal to that of the preempt-disabled period covering the whole processings described hereinbefore. As another method, it is equally conceivable to prepare separately a list for managing the resources under initialization, wherein the resource undergoing the processing (4b) is chained to this list. However, this method is disadvantageous in that overhead involved in the initialization processing increases because of an increased number of times the list-chain changing processing has to be performed.

In the light of the state of the art described above, the inventor of the present application has developed a process executing method which is capable of processing the shared resource without affecting adversely the periodical drivability of the continuous media processing by making use of the preempt control method.

Accordingly, it is a first object of the present invention to provide a process executing method for executing processes which use a shared resource in a computer system designed for continuous media processing.

According to the teaching of the invention, it is declared by the process in precedence to the use of the shared resource that the process is not forcibly terminated. Parenthetically, in the description which follows, expression "process is not aborted" or the like is used, which means that the process is not forcibly terminated, and prevention of the process from being forcibly terminated is expressed as "abort disabling" or the like. Thus, "the state in which a process is prevented from being aborted" may be expressed as "abort-disabled state" or the like. Additionally, the process is "preempt-disabled", which mean that the process is protected against interruption or suspension of the processing or task executed by that process. At the end of the use of the shared resource, the process is cleared from the preempt-disabled state. Upon completion of all the processings for the shared resource, it is declared by the process that it may be forcibly terminated, which is expressed as "clearing the process from the abort-disabled state" or simply as "clearing of the abort-disabled state" or so. Further, the time period or interval intervening between the abort-disable declaration and the abort-disabled state clearing declaration is called "abort-disabled interval". When a request for the forcive termination of a process is issued during the abort-disabled period or interval, execution of the process is continued until the processing to be executed during the abort-disabled period has been completed. When the abort-disabled state is cleared, the process is forcibly terminated.

In a preferred mode for carrying out the invention, a sole process dedicated for coping with such situation that the shared resource is used by a process over a prolonged duration is provided in the system. Further, for sending the requests for using the shared resource to the sole process, there is provided a queue. The other process destined for performing the continuous media processing issues a shared resource use request to the sole dedicated process before starting the periodical driving, and upon completion of the processing for the shared resource, the periodical driving is validated. The request mentioned above is registered in the queue. Provision of such dedicated process can ensure that it is always only one process in the system that can perform the processing for the shared resource. Thus, the processing for the shared resource can be effectuated in the preempt-enabled state, which in turn means that the processing for the shared resource can be executed in parallel with the periodically driven process or processes.

By virtue of combinations of the two process executing methods mentioned above, a plurality of processes which use the shared resource can be executed without exerting any noticeable adverse influence to the processes driven periodically in the multiprocessing environment in which a plurality of processes can run in parallel with one another.

On the other hand, in the case of the method according to which the identifier is placed in or assigned to the hash function as a key to determine the index "Index" of the resource management data containing the address of the resource for making access to the resource, there arise problems mentioned below in executing such processing which has to process a large amount of data at a high speed on a real-time basis while allocating a CPU time at every predetermined interval as in the case of the multi-media data processing.

(1) When a plurality of processes make simultaneous access to one data, collision of the hash values will take place in the accessing method using the hash function, which makes it necessary to search the overflow area while following pointers until the identifier of the resource as searched is found.

Further, when the identifier is found, it is necessary to search the process management data by following with the pointers until the process identifier is found in order to check whether or not the process attempting to make access to the shared resource has really the access right (i.e., the right of accessing the resource). Consequently, overhead involved in the processing increases considerably while the time taken for the memory access becomes too long to be useful for effective reproduction of the data.

(2) In the system in which the user application unlocks the resource, the operating system has to follow or trace the pointers of all the process management data in order to acquire the identifier of the process using the resource and release the process management data as found while messaging to the individual processes that the resource can not be used. During the period for the search mentioned above and for the execution of succeeding processings, all the accesses from the user applications to the resource are disabled or inhibited. Consequently, in the case where the resource deallocation processing takes place and in the system in which there exist a plurality of processes to be processed on a real time basis, overhead involved in searching the processes sharing the resource to be deallocated and executing the succeeding deallocation processing will increase considerably. In that case, the real-time processing is very difficult to realize or rendered impossible.

In the light of the foregoing, it is a second object of the present invention to provide an accessing method which is capable of reducing the overhead involved in the translation between the identifier and the address while sustaining the access right control function of the conventional method and decreasing the time or period during which the access to the shared resource for executing the process terminating processing is disabled.

For achieving the above and other objects which will become apparent as description proceeds, it is taught according to an aspect of the present invention that an identifier composed of address information and generation identifying information of a resource is assigned to a resource upon generation thereof and at the same time the generation identifying information is stored at a leading location of the resource. The generation identifying information is extracted from an identifier transferred as an argument of a system call issued by a user application upon making access to the resource. The extracted generation identifying information is compared with the generation identifying information stored in the resource at the leading location thereof. Access to the resource is enabled when coincidence is found between both the generation identifying information while disabled when discrepancy is found between both the generation identifying information. In this way, the access right to the resource can be controlled solely by comparing both the generation identifying information.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2A is a view for illustrating schematically a structure of resource management data employed for resource management in a computer system;

FIG. 2B is a view for illustrating schematically a structure of process management data employed for process management in the computer system;

FIG. 11 is a flow chart illustrating a processing procedure of a disabled-abort clear function (22) shown in FIG. 6;

FIG. 12 is a schematic diagram showing modules employed in carrying out the process executing method according to another embodiment of the invention;

FIG. 13 is a flow chart for illustrating a processing procedure of processes (210–212) shown in FIG. 12;

FIG. 14 is a flow chart for illustrating a processing procedure performed by a processing request messaging module (300) shown in FIG. 12;

FIG. 22 is a flow chart for illustrating a identifier creating (make_id) processing;

FIG. 23 is a flow chart for illustrating a resource access processing; and

DESCRIPTION OF THE PREFERRED EMBODIMENTS

Figure 1:
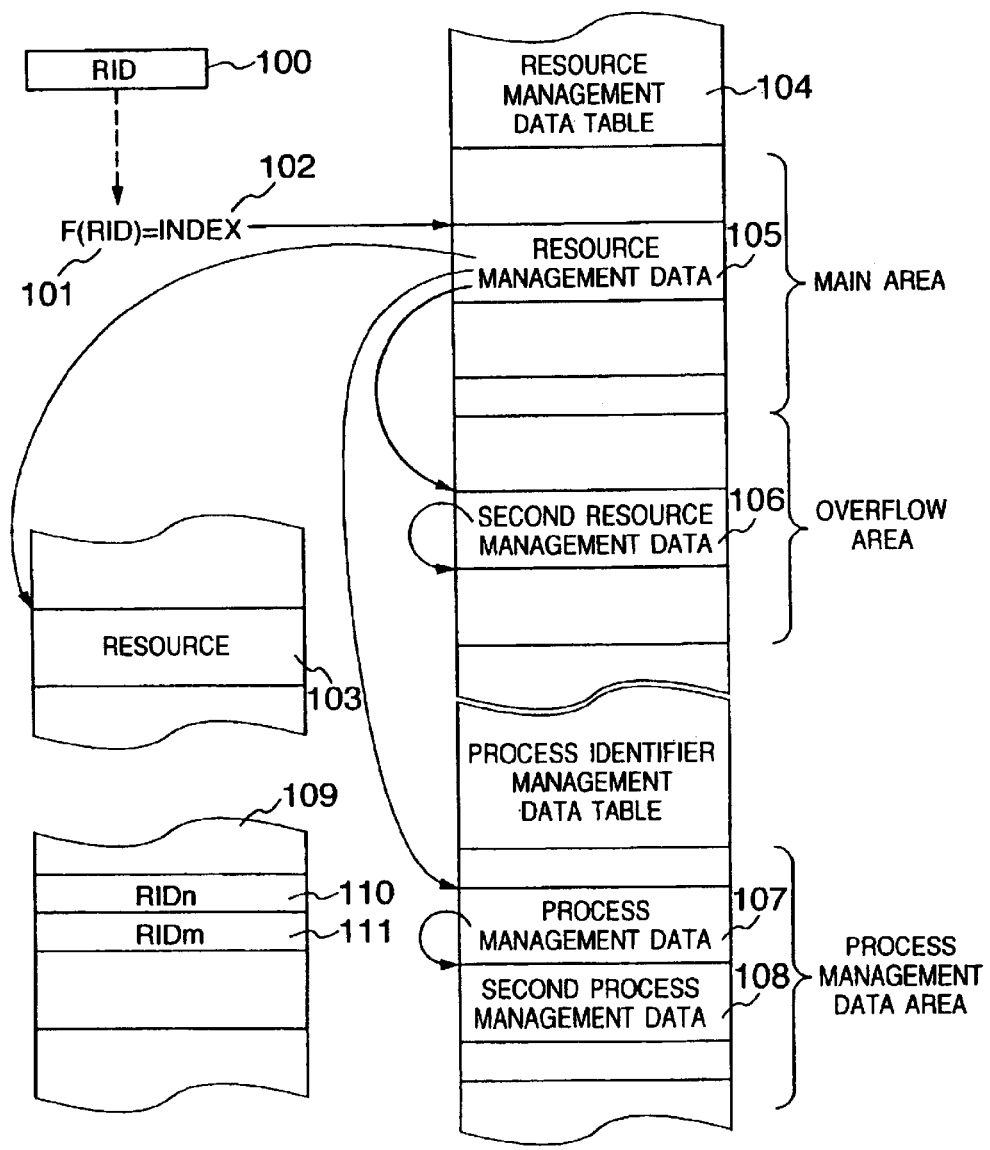
FIG. 1 is a schematic diagram for illustrating a conventional scheme for controlling access right to a shared resource in a multiprocessor computer system known heretofore.
Figure 3:
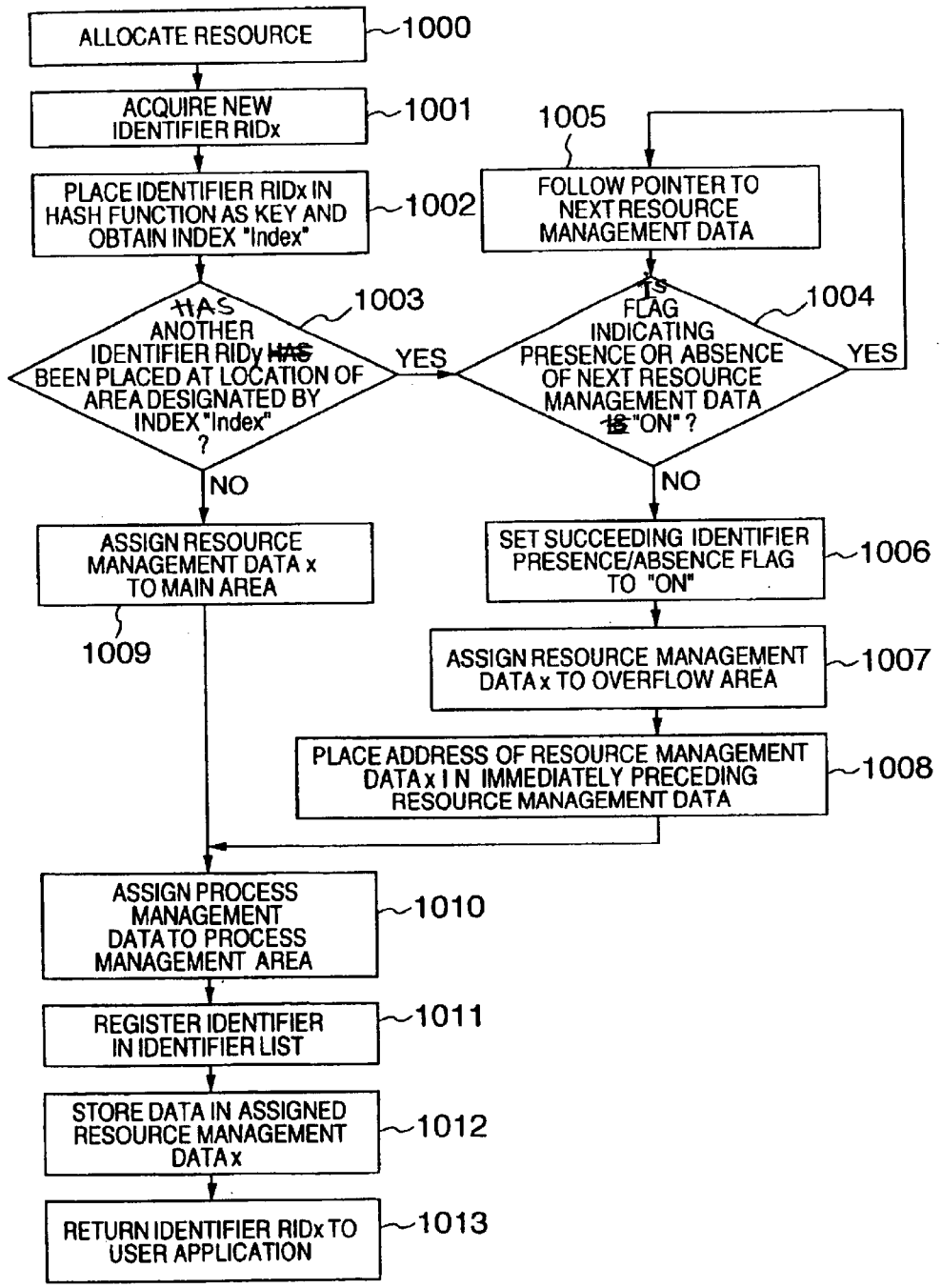
FIG. 3 is a flow chart for illustrating a conventional resource allocation processing.
Figure 4:
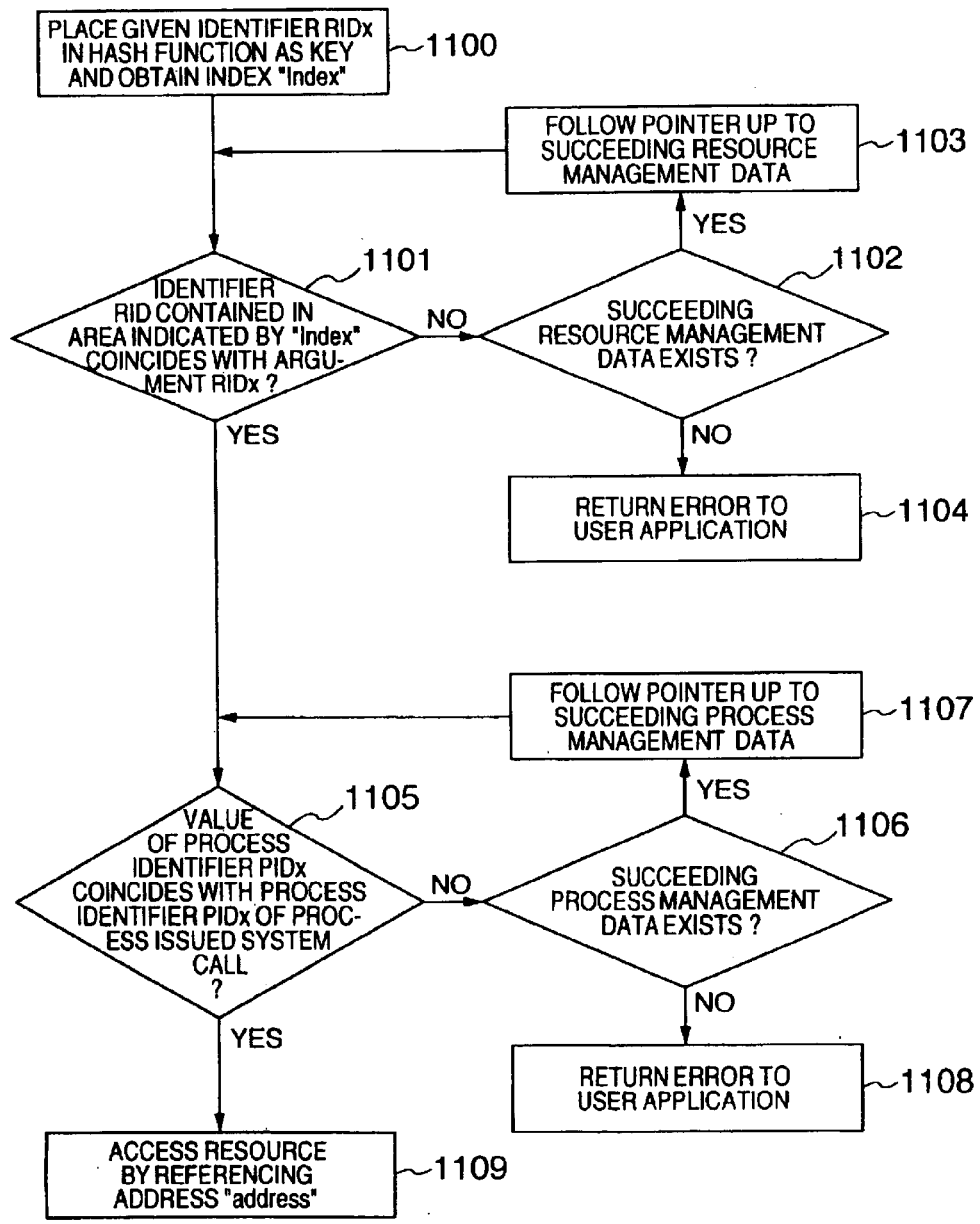
FIG. 4 is a flow chart for illustrating a conventional resource access processing.
Figure 5:
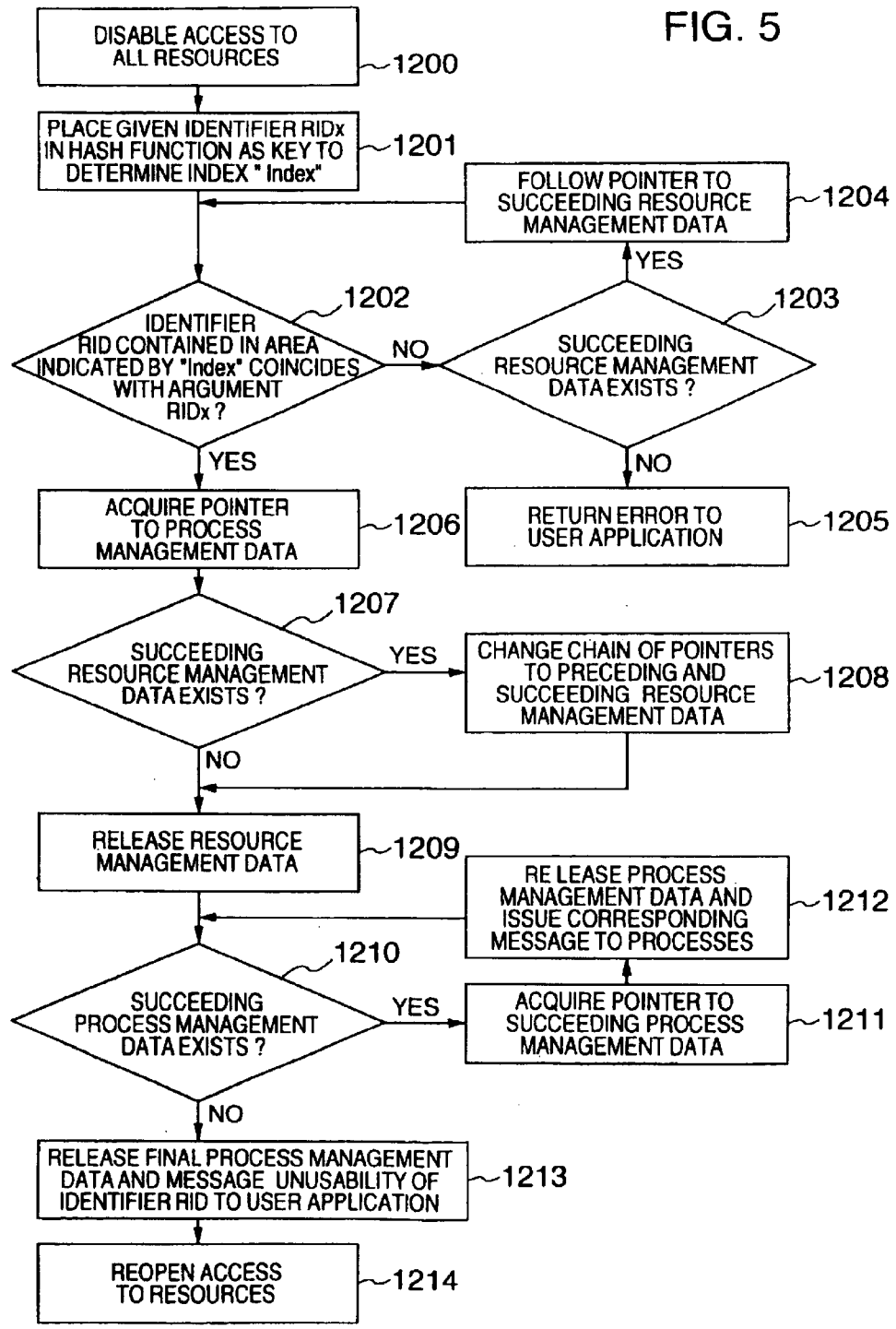
FIG. 5 is a flow chart for illustrating a conventional resource deallocation processing.

Now, the present invention will be described in detail in conjunction with what is presently considered as preferred or typical embodiments thereof by reference to the drawings. In the following description, like reference characters designate like or corresponding parts throughout the several views.

Figure 6:
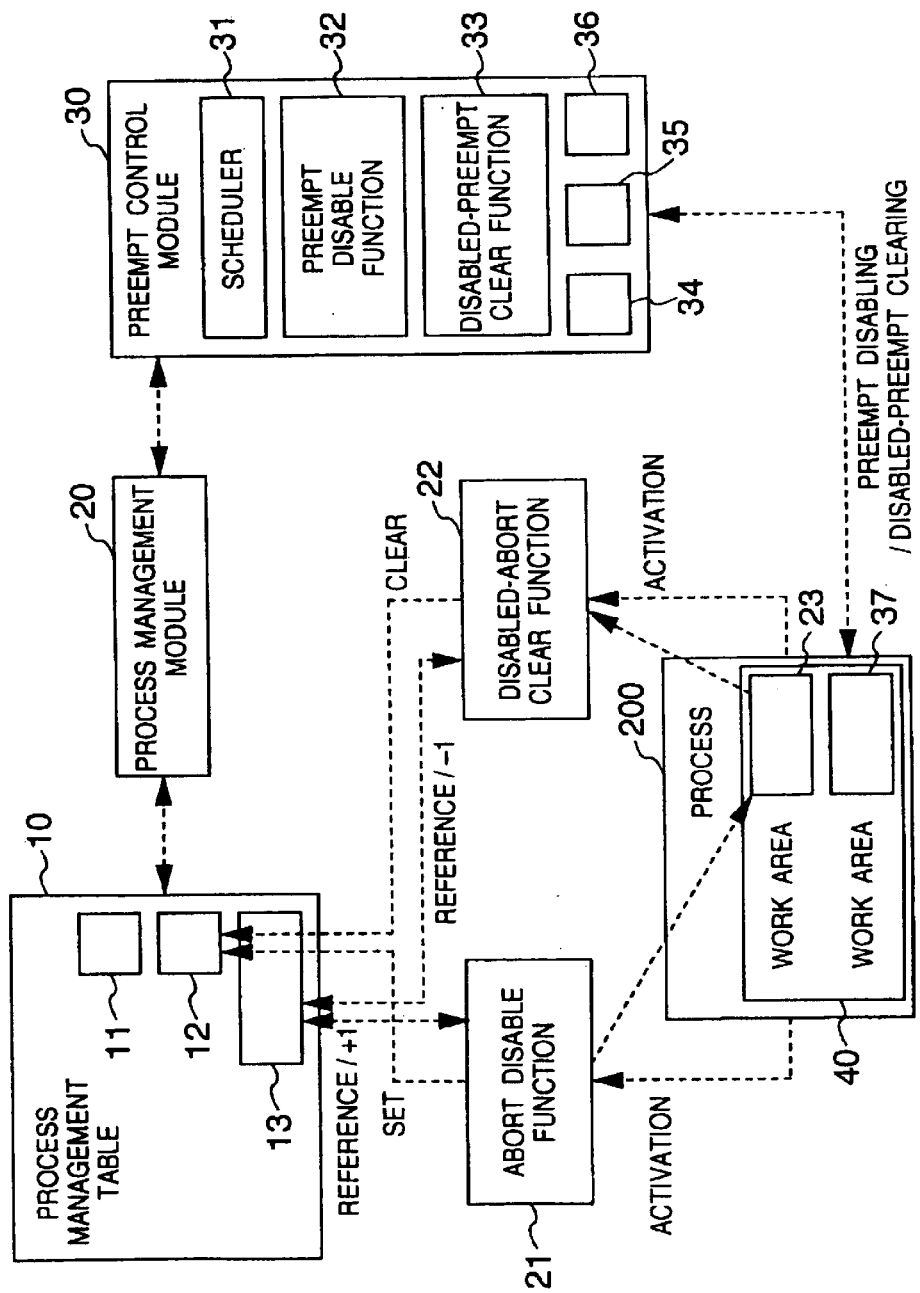
FIG. 6 is a schematic diagram showing a group of modules and data required for carrying out the method according to the embodiment of the present invention.

FIG. 6 shows schematically a set of modules and data required for carrying out a method according to an embodiment of the present invention.

In the figure, reference numeral 10 denotes a process management table 10 for controlling or managing processes. In the process management table 10, there are held an abort request flag 11, an abort-disabled flag 12, a counter 13 for counting abort disablings nested. Further, reference numeral 20 denotes a process management module for controlling or managing processes, 21 designates an interface function for setting the abort disabling, 22 denotes an interface function for clearing the abort disabling, and 200 denotes a process which requires the processing for a shared resource. Furthermore, reference numeral 40 denotes a function which uses a shared resource provided in the process 200 and which holds work areas 23 and 37. Additionally, reference numeral 30 denotes a preempt control module which is based on the teaching of the invention disclosed in Japanese Patent Application No. 8-97997. More specifically, the preempt control module 30 includes a scheduler 31, a preempt disable function 32, a disabled-preempt clear function 33, a scheduling request flag 34, a preempt-disabled flag 35 and a counter 36 for counting the preempt disablings nested.

Figure 7:
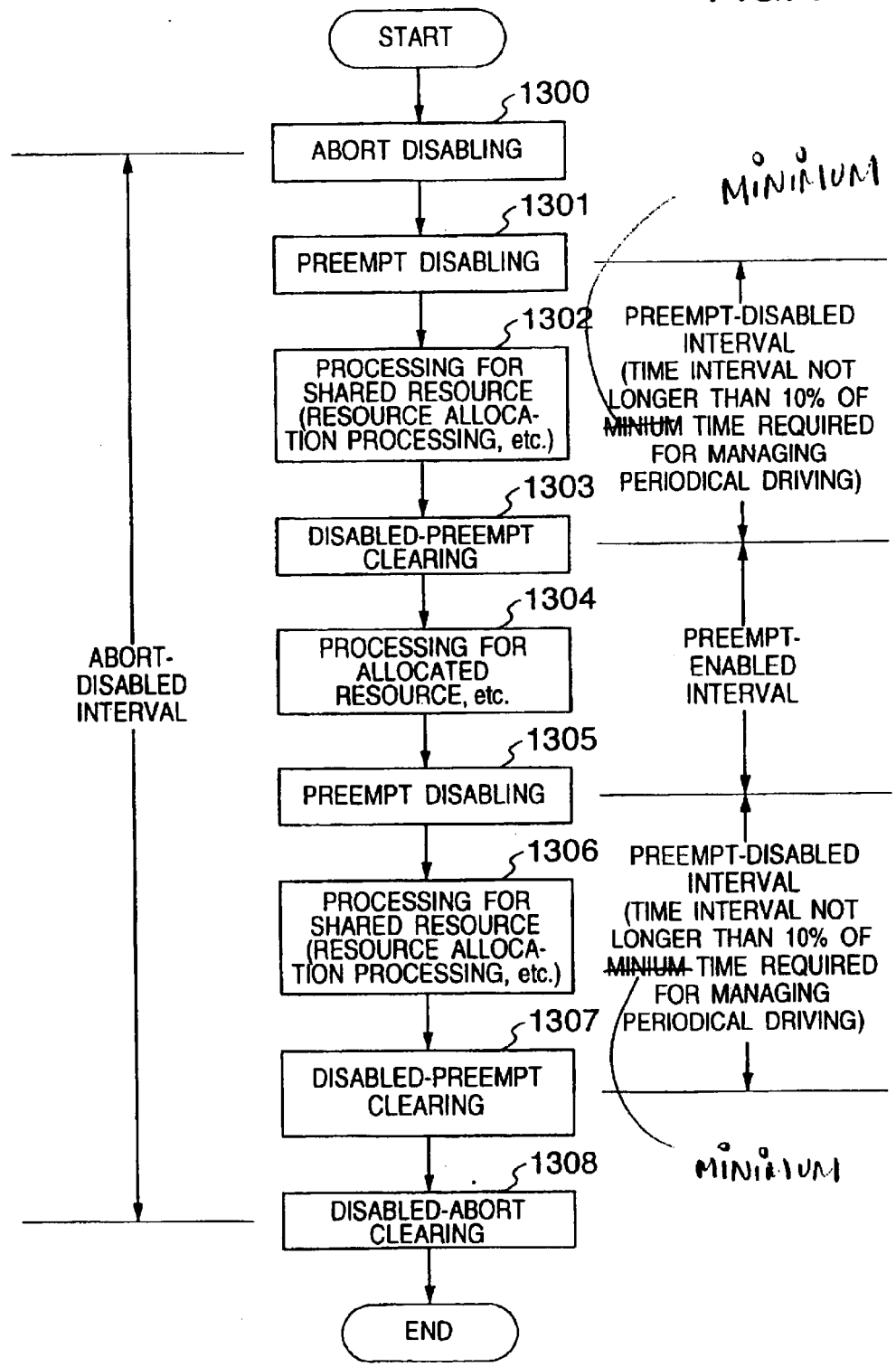
FIG. 7 is a flow chart for illustrating a processing procedure carried out according to the embodiment of the invention shown in FIG. 6.

FIG. 7 is a flow chart for illustrating a flow of controls for the abort disabling and the preempt disabling in a process for realizing a feature of the present invention. When processing relating to the shared resource is to be executed, the function 40 included in the process 200 destined for executing the above-mentioned processing initially inhibits its own process from being aborted by using the abort disable function 21 (step 1300). Immediately before using the shared resource, the function 40 inhibits its own process from being preempted by using the preempt disable function 32 held in the preempt control module 30 (step 1301), wherein the processing which makes use of the shared resource is executed (step 1302). Upon completion of the processing for the shared resource, the disabled preempt is instantaneously released or cleared with the aid of the disabled-preempt clear function 33 held in the preempt control module 30 (step 1303). At this juncture, it should be mentioned that setting of the preempt-disabled interval (or preempt-disabled section in light of the control flow) extending from the preempt disabling to the disabled-preempt clearing (corresponding to the section extending from the step 1301 to step 1303) is limited to such processing for the shared resource which is terminated within a time exerting no adverse influence to the periodical driving performance, e.g. a time not longer than 10% of a minimum time required for managing the periodical driving. During a period preceding to the subsequent declaration of the preempt disabling, there prevails a preempt-enabled state where processings require relatively a lot of time such as initialization for the allocated resource or the like is executed (step 1304). During this period, execution of the process 200 may be temporarily interrupted (or suspended) while allowing other processes to be scheduled. When the processing for the shared resource becomes necessary again, the process 200 sets itself once more to the preempt-disabled state (step 1305). When the processing for the shared resource (step 1306) comes to an end, the preempt disabling is released or cleared (step 1307). Upon completion of all the processings, the abort disabling is cleared finally by resorting to the use of the disabled-abort clear function 22 (step 1308).

In the case of the example illustrated in FIG. 7, the preempt-disabled interval makes appearance twice during the period extending from the abort disabling to the disabled-abort clearing. In actual applications, the number of such preempt-disabled intervals may be more than three inclusive thereof.

Figure 8:
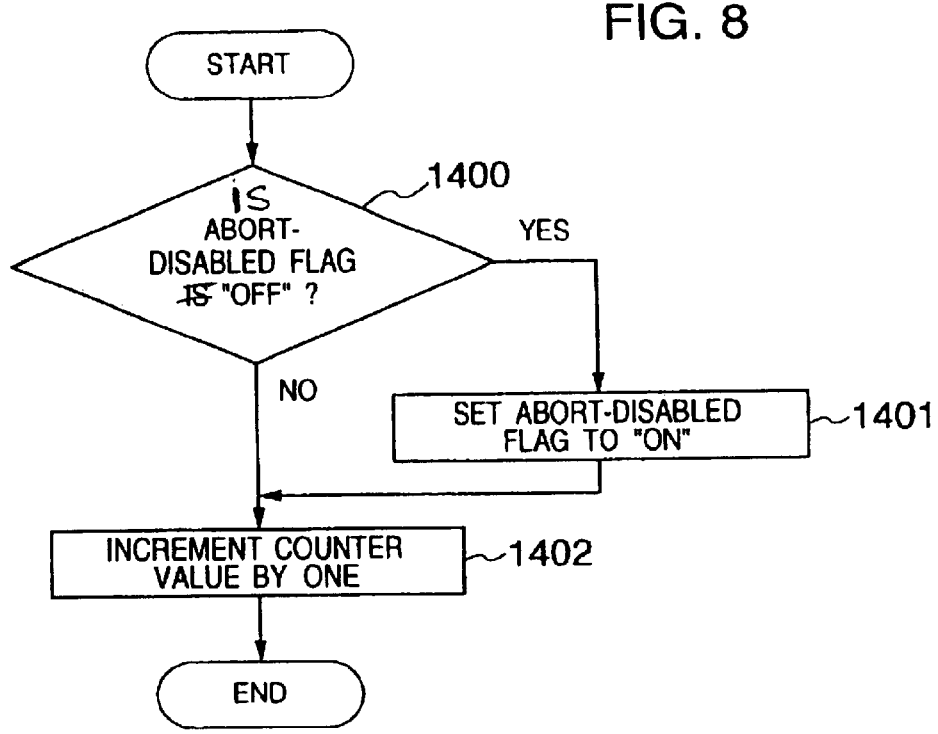
FIG. 8 is a flow chart illustrating a processing procedure of an abort disable function (21) shown in FIG. 6.

FIG. 8 is a flow chart illustrating in detail an internal processing of the abort disabling procedure (1300) mentioned above by reference to FIG. 7. Execution of the processing shown in FIG. 8 is effectuated by using the abort disable function 21. To this end, the abort disable function 21 checks at first whether the abort-disabled flag 12 held in the process management table 10 managing the process 200 is in the OFF-state or not (step 1400). When the abort-disabled flag 12 is OFF, then the abort disable function 21 sets the abort-disabled flag 12 to the ON-state (step 1401). Subsequently, the abort disable function 21 increments the value of the counter 13 by one (step 1402). The procedure shown in FIG. 8 is indivisible in execution thereof.

Figure 9:
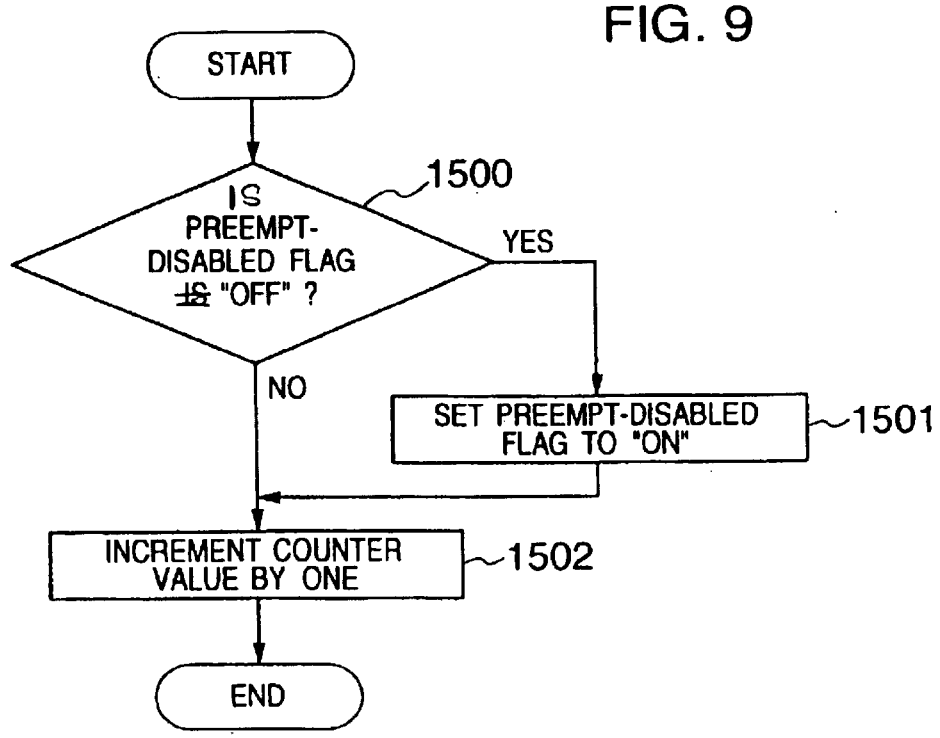
FIG. 9 is a flow chart illustrating a processing procedure of a preempt disabling function (32) shown in FIG. 6.

FIG. 9 is a flow chart illustrating in detail internal processing of the preempt disabling procedure (1301, 1305) mentioned above by reference to FIG. 7. The processing shown in FIG. 9 is executed by means of the preempt disable function 32 shown in FIG. 6. At first, the preempt disable function 32 checks whether the preempt-disabled flag 35 held in the preempt control module 30 is in the OFF-state or not (step 1500). When the preempt-disabled flag 35 is OFF, then the preempt disable function 32 sets the preempt-disabled flag 35 to the ON-state (step 1501). Subsequently, the preempt disable function 32 increments the value of the counter 36 by one (step 1502). The whole procedure shown in FIG. 9 is executed indivisibly.

Figure 10:
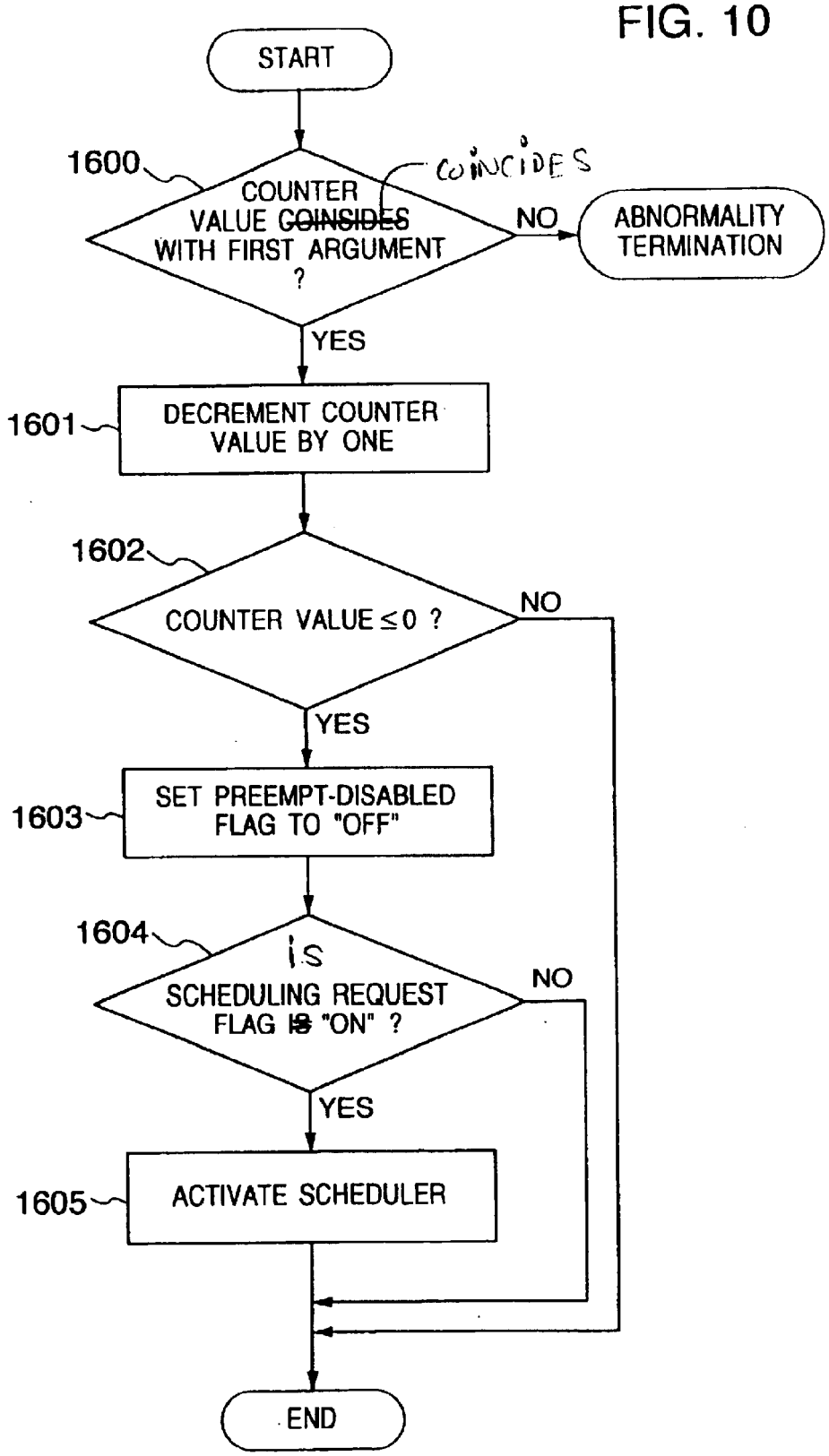
FIG. 10 is a flow chart illustrating a processing procedure of a disabled-preempt clear function (33) shown in FIG. 6.

FIG. 10 is a flow chart illustrating in detail internal processing of the disabled-preempt clearing procedure (1303, 1307) mentioned above by reference to FIG. 7. Execution of the processing shown in FIG. 10 is in charge of the disabled-preempt clear function 33 shown in FIG. 6. At first, the disabled-preempt clear function 33 checks whether or not the nest value (described hereinafter) of the function transferred as the first argument coincides with the value of the counter 36 (step 1600). Unless coincidence is found, then an abnormality processing is carried out. On the other hand, when the coincidence is found, the value of the counter 36 incorporated in the preempt control module 30 is decremented by one (step 1601). When the value of the counter 36 resulting from the decrementation is positive (plus), then the processing is terminated intact (step 1602). On the contrary, in case the value of the counter 36 is zero or negative (minus), the preempt-disabled flag is set to the OFF-state (step 1603). Subsequently, the scheduling request flag 34 held internally of the preempt control module 30 is checked (step 1604). When this flag is OFF, then the processing is terminated. On the other hand, when the scheduling request flag 34 is in the ON-state, the scheduler 31 is activated (step 1605) to thereby validate the execution of the scheduling processing for the process.

FIG. 11 is a flow chart illustrating in detail internal processing of the disabled-abort clearing procedure (1308) mentioned above by reference to FIG. 7. The processing shown in FIG. 11 is executed with the aid of the disabled-abort clear function 22 shown in FIG. 6. At first, the disabled-abort clear function 22 checks whether or not the nest value (described hereinafter) of the function transferred as the first argument coincides with the value of the counter 13 (step 1700). Unless coincidence is found, then an abnormality processing is performed. On the other hand, when coincidence is confirmed, the value of the counter 13 incorporated in the process management table 10 managing the process 200 is decremented by one (step 1701). When the value of the counter 13 resulting from the decrementation is positive (plus), the processing is terminated intact (step 1702). By contrast, in case the value of the counter 13 is zero or negative (minus), the abort-disabled flag is set to the OFF-state (step 1703). Subsequently, the abort request flag 11 held internally of the process management table 10 is checked (step 1704). When this flag is OFF, then the processing is terminated. On the other hand, when the abort request flag 11 is ON, the process management module 20 is activated (step 1705) to thereby validate the execution of the abort processing for the process 200.

Furthermore, in case the processing shown in FIG. 11 is terminated in the OFF-state of the abort request flag 11, the process management module 20 activates the scheduler 31 incorporated in the preempt control module 30 to perform the process rescheduling processing.

Referring to FIG. 6, the interval or period during which the abort-disabled flag 12 remains in the ON-state, i.e., the period from a time point at which the abort disable function 21 is called to set the abort-disabled flag 12 to the ON-state to a time point at which the disabled-abort clear function 22 is called to set the abort-disabled flag 12 to the OFF-state represents the abort-disabled interval. The abort-disabled flag 12 is in the OFF-state when the process is created or generated and set to the ON-state only when the abort disable function 21 is called. In case the forcive termination of the process 200 occurs during the abort-disabled interval during which the abort-disabled flag 12 remains in the ON-state as set by the abort disable function 21 called by the process 200, the process management module 20 executes only the processing for setting the abort request flag 11 to the ON-state while allowing the processing of the process 200 to be continued. The forcive termination of the process 200 is validated when the abort-disabled flag 12 is set to the OFF-state by the disabled-abort clear function 22 called by the process 200.

Further, referring to FIG. 6, the interval or period during which the preempt-disabled flag 35 remains in the ON-state, i.e., the period extending from a time point at which the preempt disable function 32 is called to set the preempt-disabled flag 35 to the ON-state to a time point at which the disabled-preempt clear function 33 is called to set the preempt-disabled flag 35 to the OFF-state represents the preempt-disabled interval. The preempt-disabled flag 35 is in the OFF-state when the system is activated and set to the ON-state only when the preempt disable function 32 is called. In case the scheduling request for the other process (es) occurs during the interval in which the preempt-disabled flag 35 remains in the ON-state as set by the preempt disable function 32 called by the process 200, the scheduler 31 executes only the processing for setting the scheduling request flag 34 to the ON-state while allowing the processing of the process 200 to be continued without scheduling the other process(es). When the preempt-disabled flag 35 is set to the OFF-state by the disabled-preempt clear function 33 called by the process 200, the scheduler 31 sets the scheduling request flag to the OFF-state and suspends the execution of the process 200 while allowing other processes to be scheduled.

Referring to FIG. 7, in the interval or section extending from step 1301 to step 1303 and in the interval or section extending from step 1305 to step 1307, the preemption is disabled, which in turn means that the right of using the CPU (Central Processing Unit) is never transferred to other process. Thus, it is only the running process that can use the shared resource. In other words, any other process is inhibited from using the shared resource, whereby the exclusive control or management of the resource can be realized, which makes it possible to perform the continuous media multiprocessing using the shared resource. Additionally, because abortion is disabled during the interval spanning over steps 1300 to 1308, any process acquired the resource is caused to vanish due to the forcive termination. Thus, the resource is positively prevented from falling in such state that it can not be utilized for an indefinite period.

The abort disabling as well as the disabled-abort clearing is effectuated through the medium of interfaces mentioned below, respectively.
<Function Name>
  abort_disable(*level)
<Argument>
  level: the depth of the nest formed by a pair of the instant function now under consideration and the function "abort_enable" is returned.
<Elucidation>
  The function now of concern can make the currently executed process transit to the abort-disabled state. This function and the function "abort_enable" may be issued in a pair during the section or period spanning over the transition to the abort-disabled state in response to the issuance of this function and the restoration to the abort-enabled state in response to the issuance of the function "abort_enable". This means that the pair of the function now of concern and the function "abort_enable" can be nested. The function now of concern and the function "abort_enable" issued internally of the nest make no state transition between the abort-disabled state and the abort-enabled state. The argument "level" reflects the depth of such nested state.
<Function Name>
  abort_enable(level)
<Argument>
  level: the level of the nest returned from the function "abort_disable" which constitutes the counter-part to be paired with the instant function is designated.
<Elucidation>
  The function of concern can make the currently executed process be restored to the abort-enabled state. The function now of concern (i.e., "abort_enable") and the function "abort_disable" may be issued in a pair during the section or period spanning over the transition to the abort-disabled state in response to the issuance of the function "abort_disable" and the restoration to the abort-enabled state in response to the issuance of the instant function. This means that the pair of the function "abort_disable" and the function now of concern "abort_enable" can be nested. The function "abort_disable" and the function now of concern issued internally of the nest make no state transition between the abort-disabled state and the abort-enabled state. The argument "level" designates or represents the depth of such nest, i.e., the value of "level" due to the issuance of the counterpart function "abort_disable". This value is held by the operating system as well. Thus, discrepancy of this value with the depth of the nest specified by the argument, the so-called error return takes place.

When the function 40 included in the process 200 uses the abort disable function 21, the function 40 stores in its own work area 23 the current depth of the nest returned from the abort disable function 21. For issuing the disabled-abort clear function 22, the value stored in the work area 23 is designated or specified as the argument of the function 40. The disabled-abort clear function serves to compare the value mentioned above with the current depth of the nest to validate the error return unless coincidence is found between both the values mentioned above. By virtue of this function, it is possible to detect easily such a programming bug that the disabled-abort clear function which is to constitute the counterpart of the abort disable function in a pair, is absent.

The preempt disable processing and the disabled-preempt clearing processing can be carried out by making use of the disabled-preempt clearing interface and the disabled-preempt clearing interface disclosed in Japanese Patent Application No. 8-97997 mentioned hereinbefore. Namely, the following interfaces are employed.

<Function Name>
  preempt_disable(*level)
<Argument>
  level: the depth of the nest formed by a pair of the instant function now of concern (i.e., "preempt_disable") and the function "preempt_enable" is returned.
<Elucidation>
  The function now of concern makes the currently executed process transit to the preempt-disabled state. This function "preempt_disable" and the function "preempt_enable" may be issued in a pair during the section or interval intervening between the transition to the preempt-disabled state in response to the issuance of this function and the restoration to the preempt-enabled state in response to the issuance of the function "preempt_enable". This means that the pair of the function now of concern and the function "preempt_enable" can be nested. The function now of concern and the function "preempt_enable" issued internally of the nest make no state transition between the preempt-disabled state and the preempt-enabled state. The argument "level" reflects the depth of such nest.
<Function Name>
  preempt_enable(level)
<Argument>
  level: the level of the nest returned by the function "preempt_disable" which is to constitute a counterpart of the pair of the instant function is designated.
<Elucidation>
  The function of concern can make the currently executed process restore to the preempt-enabled state. The function "preempt_disable" and this function may be issued in a pair during the interval or period spanning over the transition to the preempt-disabled state in response to the issuance of the function "preempt_disable" and the restoration to the preempt-enabled state in response to the issuance of this function. This means that the pair of the function "preempt_disable" and the function of concern can be nested. The function "preempt_disable" and the function now of concern issued internally of the nest make no state transition between the preempt-disabled state and the preempt-enabled state. The argument "level" designates the depth of such nest, i.e., the value of "level" obtained due to the issuance of the counterpart function "preempt_disable". The depth of the nest is held by the operating system as well. Thus, discrepancy of this value with the depth of the nest specified by the argument, the so-called error return takes place.

When the function 40 included in the process 200 uses the preempt disable function 32, the function 40 stores in its own work area 37 the current depth of the nest returned from the preempt disable function 32. For issuing the disabled-preempt clear function 33, the value stored in the work area 23 is designated or specified as the argument of the function 40. The disabled-preempt clear function serves to compare the value mentioned above with the current depth of the nest to thereby validate the error return unless coincidence is found between both the values mentioned above. By virtue of this function, such a programming bug can easily be detected that the disabled-preempt clear function which is to constitute the counterpart of the preempt disable function in a pair is absent.

Next, description will turn to an embodiment of the invention which is directed to a method of executing a process using a shared resource in the case where the shared resource is used for a prolonged duration.

In the process executing method according to the instant embodiment of the invention, a periodically driven process performs processing for acquiring the resource as required by using the process executing method described below in the state not periodically driven in precedence to the start of the periodical driving. After completion of the above processing, the process starts to be driven periodically. Once the periodical driving has been started, no processing is performed for acquiring the resource in the process executing method described below.

FIG. 12 shows modules which are required for carrying out the process executing method according to the instant embodiment of the invention.

In FIG. 12, reference numerals 210 to 212 denote, respectively, those processes which are requesting use of the shared resource, and numeral 220 denotes the sole process that is authorized to perform the processing for a specific shared resource. This process 220 will hereinafter be called the serializer process. The serializer process 220 is resident within the system. A numeral 300 denotes a processing request messaging module for messaging to the serializer process 220 the processing requests issued by the processes 210 to 212, respectively. In correspondence to the serializer process 220, the sole processing request messaging module 300 is provided and constantly resident within the system as in the case of the process 220. Reference numerals 310 to 312 denote, respectively, processing completion messaging modules for transferring the process completion message from the serializer process 220 to the processes 210 to 212, wherein the processing completion messaging modules 310 to 312 are assigned to the processes 210 to 212, respectively, upon generation thereof or upon issuance of the processing request therefrom. The processing request messaging module 300 and the processing completion messaging modules 310 to 312 have internally queues 400, 410 to 412, respectively.

Next, processings executed in the system shown in FIG. 12 will be described by reference to flow charts shown in FIGS. 13 to 16.

FIG. 13 is a flow chart for illustrating a processing executed by each of the processes 210 to 212 which need the processing for the shared resource. More specifically, each of the processes 210 to 212 issues a processing requesting message to the processing request messaging module 300 for requesting the processing of the serializer process 220 which is capable of accessing the shared resource (step 1800). The process 210 or 211 or 212 which has issued the processing request is immediately set to the state waiting for reception of the processing completion message from the associated one of the processing completion messaging modules 310 to 312 after completion of the processing request message. When the processing completion is informed from the processing completion messaging module 310 or 311 or 312 (step 1801), the process 210 or 211 or 212 fetches the processing completion message from the queue 410 or 411 or 412 provided in the associated one of the processing completion messaging modules 310 to 312 (step 1802), whereupon the processing for the shared resource as requested by one of the processes 210 to 212 comes to an end.

FIG. 14 is a flow chart for illustrating the processings performed by the processing request messaging module 300. It is first to be mentioned that the processing request messaging module 300 is constantly in the state ready for reception of the processing request message. Upon reception of the processing request message (step 1900), the processing request messaging module 300 places the processing request message in the queue 400 in the order as the message is received (step 1901), wherein the processing request messaging module 300 informs the serializer process 220 that the processing request has been issued.

Figure 15:
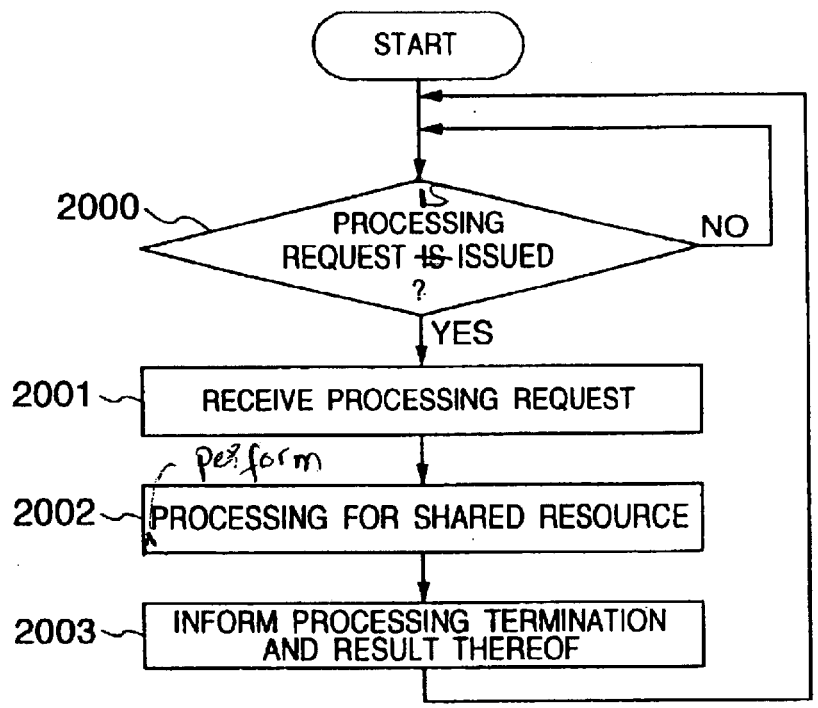
FIG. 15 is a flow chart for illustrating a processing procedure performed by a serializer process module (220)

FIG. 15 is a flow chart for illustrating the processing performed by the serializer process 220 which is the sole process capable of performing processing for the shared resource. Similarly to the processing request messaging module 300, the serializer process 220 is constantly in the state waiting for reception of the processing request message. Upon reception of the information concerning issuance of a processing request from the processing request messaging module 300 (step 2000), the serializer process 220 fetches or receives the processing request from the queue 400 incorporated in the processing request messaging module 300 (step 2001) to perform the processing on or for the shared resource in accordance with the request (step 2002). After completion of the processing for the shared resource, the serializer process 220 informs the processing completion and the result of the processing to one of the processing completion messaging modules 310 to 312 which is associated with one of the processes 210 to 212 which has issued the corresponding processing request (step 2003). In the meanwhile, the serializer process 220 checks whether the next processing request is placed in the queue. If so, the serializer process 220 performs the processing for the shared resource in accordance with that processing request. Otherwise, the serializer process 220 resumes the state ready for reception or acceptance of the succeeding or next processing request (step 2000).

Figure 16:
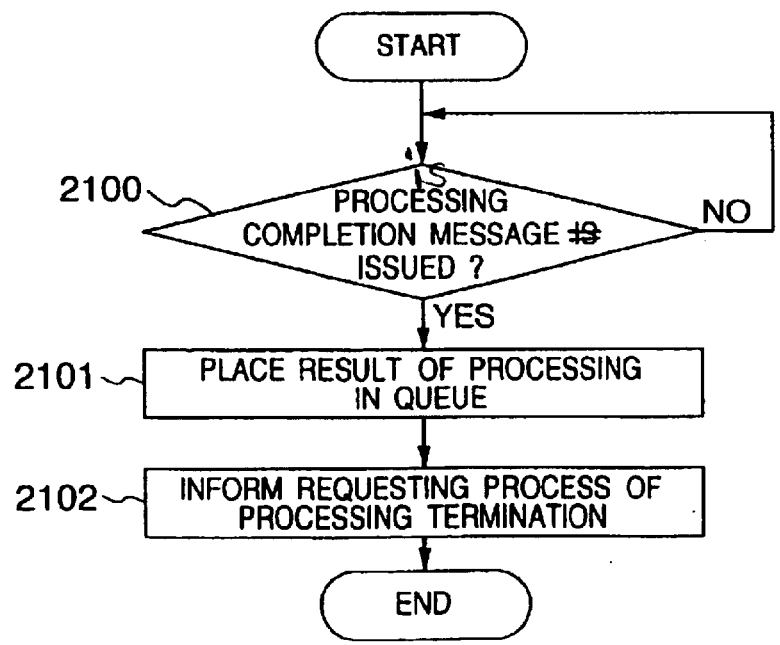
FIG. 16 is a flow chart for illustrating processings performed by processing completion messaging module (310–312) shown in FIG. 12.

FIG. 16 is a flow chart for illustrating the processings performed by the processing completion messaging module 310 or 311 or 312. Each of the processing completion messaging modules 310, 311 and 312 is set to the state waiting for the message informing the processing completion simultaneously with issuance of the processing request from the associated one of the processes 210 to 212. Upon reception of the processing completion from the serializer process 220 (step 2100), the processing completion messaging module places the processing completion message and the result of the processing in the associated one of the queues 410 to 412 (step 2101), whereupon the processing completion messaging module 310 or 311 or 312 issues the message indicating the processing completion to the relevant one of the processes 210 to 212 which has issued the processing request (step 2102).

In the case of the system illustrated in FIG. 12, it is assumed that there exist three processes 210, 211 and 212 which request the processing for the shared resource. It goes however without saying that the contents of the processings are essentially invariable even when the number of the processes requesting the shared-resource involving processing is less or more than three.

At this juncture, it should be mentioned that the serializer process 220 in the system shown in FIG. 12 operates constantly in the preempt-enabled state.

Further, it should be again mentioned that the process 210, 211 or 212 perform the resource acquiring processings mentioned above (FIG. 13) before the periodical driving thereof is started. In other words, the process (210, 211, 212) acquires the resource data in the state irrelevant to the periodical driving which is started only after the resource has been acquired due to the processing described above.

By adopting the process executing method based on the serializer process described above, the exclusive control (i.e., mutual exclusion control or management) need not be performed because the process which can perform processing directly on or for the shared resource is only one, i.e., the serializer process. Thus, by virtue of the arrangement that the processing for the shared resource is performed by the preempt-enabled independent process dedicated to the processing for the shared resource, process execution can be accomplished without exerting any influence to the periodical driving performance (or periodical drivability) of other processes partaking in the continuous media processing.

As is apparent from the foregoing description, a shared resource can be shared by the individual processes involved in the continuous media processing or the like without exerting any influence to the periodical drivability of the processes in the multiprocessing environment in which the shared resource is made use of.

Next, description will be made of an accessing method according to another embodiment of the present invention.

§1. Configuration

Major components or modules partaking in an access right control will be described by reference to FIGS. 17A, 17B and 17C.

Figure 17A:
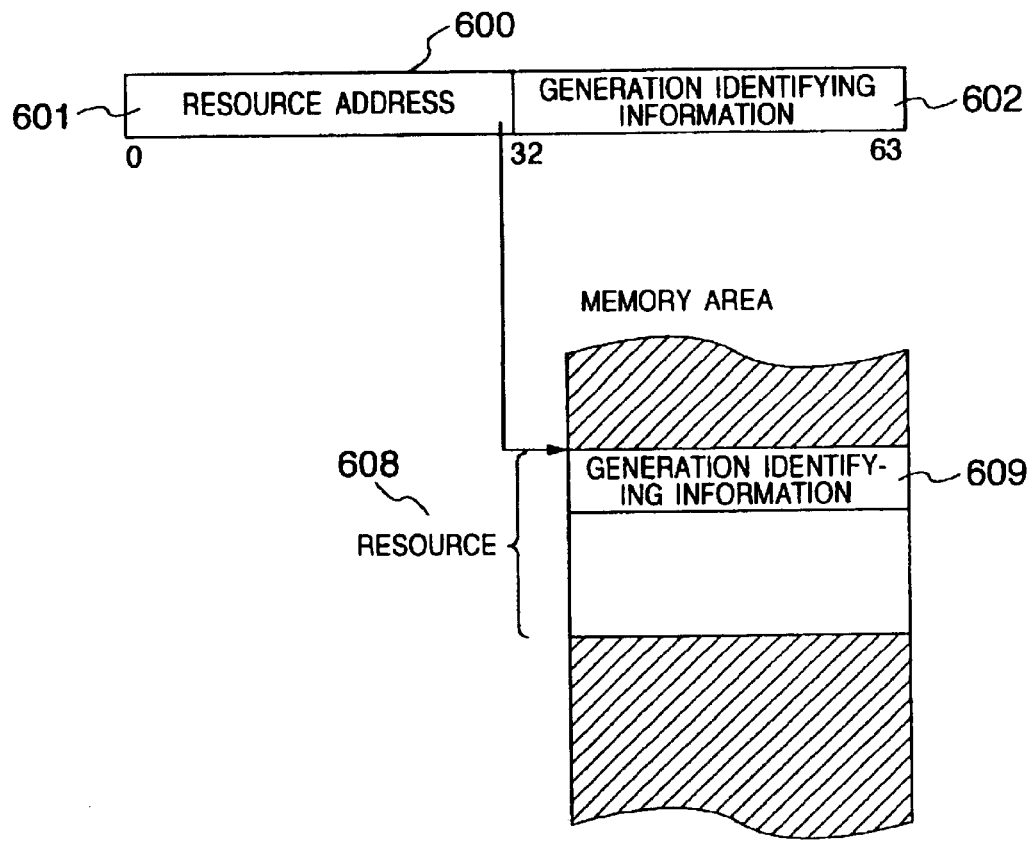
FIGS. 17A, 17B and 17C are views showing schematically major structural components partaking in the control or management of access right.

An resource identifier 600 shown in FIG. 17A is an argument of 64 bits contained in the system call issued by a user application for using the same in the access to the resource. Of the 64-bit argument, the leading 32 bits are used for identifying a starting or leading address 601 of a resource 608 while the trailing 32 bits constitute generation identifying information 602. The resource identifier 600 is generated upon creation of the resource and used for making access to the resource until the resource is released or deallocated.

Figure 17B:

A resource generation counter 603 shown in FIG. 17B is created for each of the processes upon generation thereof and serves as a counter for recording the number of times the resource is generated. The count value 604 of the resource generation counter 603 is set to the initial value of zero and incremented by one every time the resource is created.

Figure 17C:
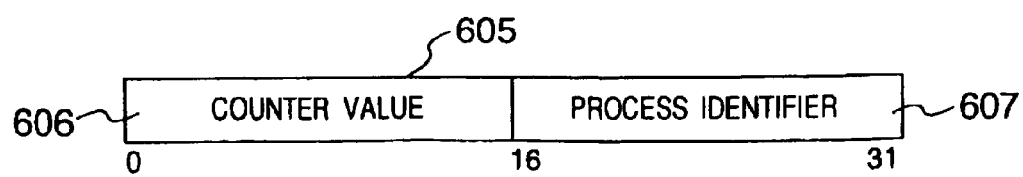

Generation identifying information 605 shown in FIG. 17C contains leading 16 bits representing a count value 606 of the resource creation counter with the trailing 16 bits representing a process identifier 607.

Hereinafter, the resource which contains the generation identifying information 609 at a leading or starting location thereof will be referred to as the resource 608.

§2. Outline of Resource Access Processing of User Application

Figure 18:
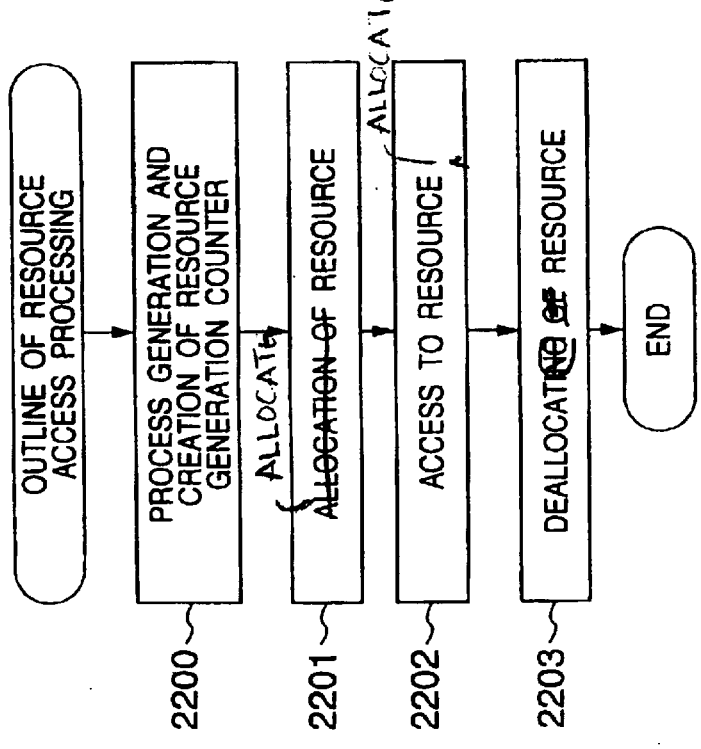
FIG. 18 is a flow chart for illustrating generally a flow of resource access processing.

FIG. 18 is a flow chart illustrating a flow of program for executing the resource access processing carried out by the method according to the instant embodiment of the invention, which will be described below stepwise.

(1) In a step 2200, a user application issues a system call requesting a process generating processing to the operating system, which responds thereto by creating a resource generation counter 603 for the process as generated.

(2) In a step 2201, the user application issues to the operating system a system call for the resource allocation processing.

(3) In a step 2202, the user application issues to the operating system a system call requesting an access processing to the resource allocated in the step 2201.

(4) In a step 2203, the user application issues to the operating system a system call requesting a deallocation processing of the resource allocated in the step 2201.

In the following, the processing for each of the system calls mentioned above will be described in detail.

§2.1. Resource Allocation Processing

Figure 19:
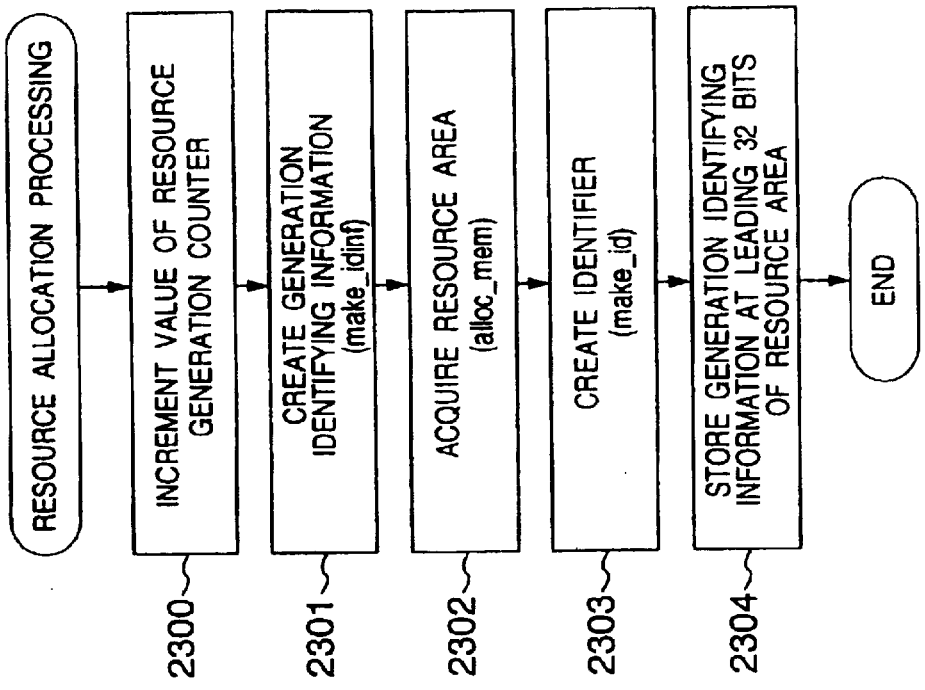
FIG. 19 is a flow chart for illustrating schematically a resource allocation processing.

FIG. 19 shows a flow chart for illustrating the resource allocation processing step 2201 shown in FIG. 18. The resource generation counter is incremented by one (step 2300 in FIG. 19), wherein generation identifying information creating or making processing "make_idinf" is executed (step 2301), which is then followed by step 2302 in which a resource area allocation (or memory area acquisition) processing "alloc_mem" is executed and step 2303 of creating an identifier "make_id" is executed. Thereafter, the generation identifying information is stored at leading 32 bits of the resource area as returned (step 2304).

§2.1.1. Generation Identifying Information Creating (make_idinf) Processing

Figure 20:
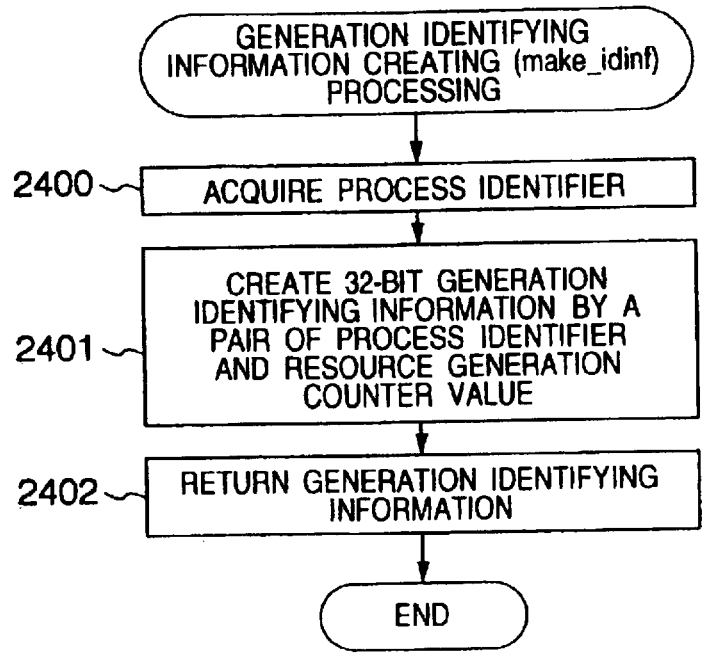
FIG. 20 is a flow chart for illustrating a generation identifying information creating (make_idinf) processing.

FIG. 20 shows a flow chart for illustrating the generation identifying information creating processing in step 2301 shown in FIG. 19. Hereinafter, this processing will also be referred to as "make_idinf" processing. The generation identifying information is created by a pair of the resource generation counter value and the process identifier of the process destined for the resource generation. Referring to FIG. 20, the process identifier is first acquired (step 2400), wherein the resource generation counter value is placed in the leading 16 bits while a random number value as generated is stored in the trailing 16 bits, to thereby create or make the 32-bit generation identifying information (step 2401). The generation identifying information as created is returned (step 2402).

§2.1.2. Resource Area Acquisition (Memory Allocation) (alloc_mem) Processing

Figure 21:
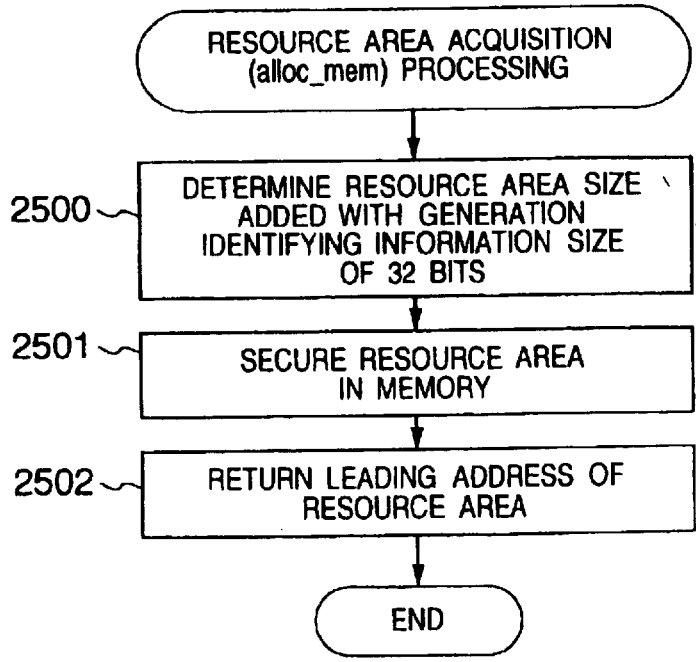
FIG. 21 is a flow chart for illustrating a resource area acquisition (alloc_id) processing.

FIG. 21 shows a flow chart for illustrating the resource acquisition (or allocation) processing in the step 2302 shown in FIG. 19. This processing will also be referred to as "alloc_mem" processing. Because the resource area is constituted by a generation identifying information area and a resource area, the resource area size added with the generation identifying information data size of 32 bits is determined (step 2500), wherein the resource area of the size as determined is allocated (step 2501). Thereafter, the leading address of the resource area (memory area) is returned (step 2502).

§2.1.3. Identifier Creating (make_id) Processing

FIG. 22 shows a flow chart for illustrating the identifier creating processing in the step 2303 shown in FIG. 19. Hereinafter, this processing will also be referred to as "make_id" processing. The identifier is constituted by a pair of the resource address and the generation identifying information. The address of the resource acquired in resource area allocation or "alloc_mem" processing (step 2302) is placed at leading 32 bits while the generation identifying information created in the generation identifying information creating "make_id" processing (step 2301) is placed at the trailing 32 bits, to thereby create the identifier of 64 bits (step 2600). The identifier as created is returned as the argument for use in making access to the resource (step 2601).

§2.2. Resource Access Processing

FIG. 23 shows a flow chart for illustrating a resource access processing corresponding to the step 2202 in FIG. 18. Referring to FIG. 23, the leading 32 bits of the identifier received as the argument of the system call issued by the user application are extracted to thereby define the resource address while the trailing 32 bits are extracted for defining the generation identifying information S1 (step 2700). Subsequently, the leading 32 bits are read out from the resource on the basis of the resource address to define the generation identifying information S2, i.e., "read_mem" information (step 2701), wherein the generation identifying information S1 and S2 as extracted are compared with each other (step 2702). Unless the comparison results in coincidence, the access to the resource is not performed, and an error message is returned (step 2703). On the other hand, when the above comparison results in coincidence, then the access processing to the resource is performed (step 2704).

§2.3. Resource Deallocation Processing

Figure 24:
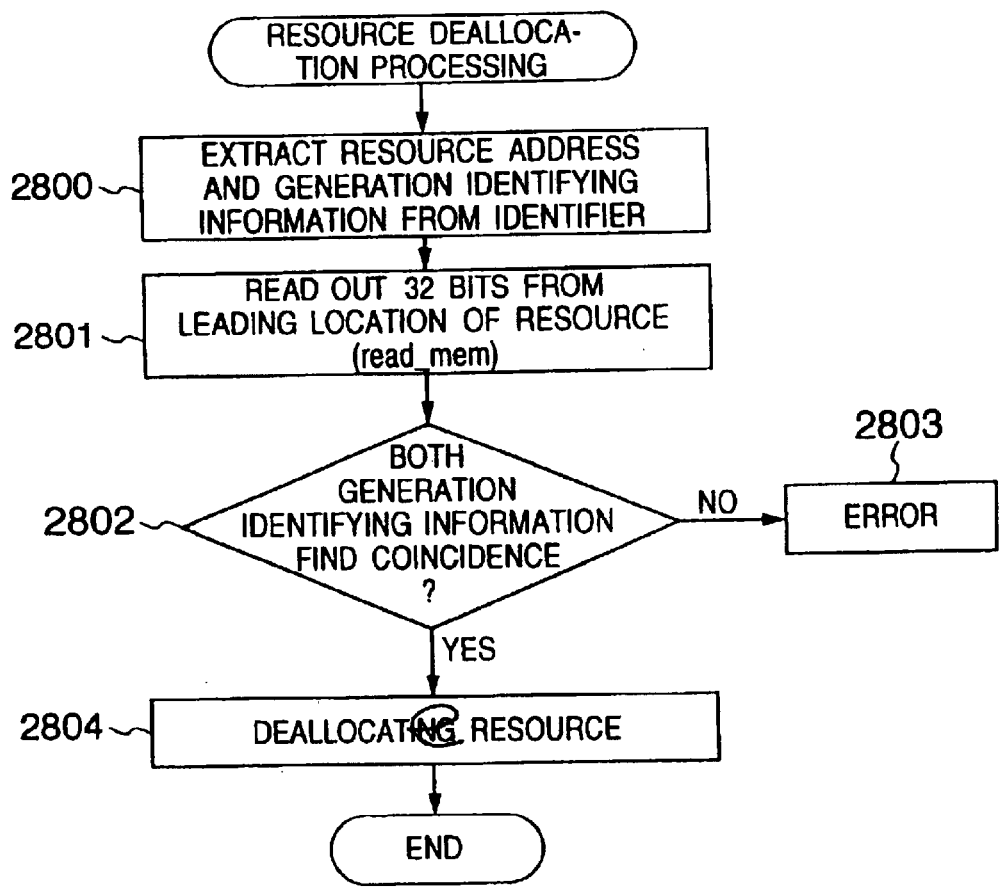
FIG. 24 is a flow chart for illustrating a resource deallocation processing.

FIG. 24 is a flow chart for illustrating a resource deallocation processing.

Similarly to the resource access processing (step 2202 shown in FIG. 18), in the resource deallocation processing (step 2203 shown in FIG. 18), the leading 32 bits of the identifier received as the argument of the system call issued by the user application are extracted to define the resource address while the trailing 32 bits are extracted for defining the generation identifying information S1 (step 2800). Subsequently, the leading 32 bits are read out from the resource to define the generation identifying information S2 "read_mem" processing (step 2801). Then, the generation identifying information S1 and S2 mentioned above are compared with each other (step 2802). Unless the comparison results in coincidence, the resource is not deallocated and a corresponding error message is returned (step 2803). On the other hand, when the above comparison results in coincidence, then the resource deallocation processing is performed (step 2804).

By virtue of the methods described above, there can be obtained advantageous effects mentioned below.

(1) As is obvious from the description concerning the resource access processing (§2.2.), the address for accessing the resource is contained in the identifier which is the argument of the system call issued by the user application to the operating system. Thus, it is possible to make access to the resource by using the identifier in place of using the hash function for the translation between the identifier and the address. Consequently, overhead involved by the use of the hash function can be diminished.

(2) Let's suppose that a process A and a process B share a resource and that the process A has issued a system call for deallocating the resource X. In that case, in the conventional system, the operating system searches the identifiers contained in the resource management data by following the pointers, starting from the index derived by using the hash function to thereby determine the address of the resource to be deallocated. Further, other processes sharing the resource X is searched to release all the process management data as found and issue a message indicating that the resource X is invalid. In the meantime, the operating system inhibits or disables all the accesses to the shared resource from the user applications.

By contrast, according to the methods of the invention, the address of the resource can be obtained for unlocking the resource without need for following the pointers for acquiring the address of the resource because the address has already been contained in the identifier of the resource X to be deallocated. Additionally, it is apparent from the previous description concerning the resource deallocation processing (§2.3.), the operating system controls or manages the resource access right on the basis of only the result of comparison between the generation identifying information S1 contained in the identifier assigned to the resource X and the generation identifying information S2 stored in the leading of the resource X. Thus, the task imposed on the operating system is only the deallocation of the resource X.

In this manner, the duration of the state in which the access to the resource is disabled and which makes appearance between the successive process completion processings can be reduced to only the time involved in deallocating the resource X.

(3) In conjunction with the resource deallocation processing described above, it is again assumed that a process C generates a resource Y and allocates the created resource Y to the address having been allocated to the resource X in the state in which the resource X is deallocated or released. In that case, the operating system issues to the process B no information or message indicating that the resource X has been deallocated. Consequently, there may arise such situation that the process B tries to make access to the resource Y on the basis of the address information contained in the identifier of the process B. However, because the identifier contains not only the address information but also the generation identifying information and because the generation identifying information is different between the identifier assigned to the resource X and the identifier assigned to the resource Y, the process B trying to make access to the resource Y with its own identifier can not access the resource Y. In this manner, the illegal access can be positively inhibited or disabled.

§3. Other Embodiments

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the construction and operation illustrated and described. Accordingly, all suitable modifications and equivalents may be resorted to, falling within the spirit and scope of the invention. Modifications of the embodiments described above will be mentioned below.

§3.1. System Utilizing System Clock

Upon starting-up of the system, a 32-bit system clock is generated for holding the time as lapsed on a 10-$\mu$ second basis.

When a resource is created, the value of the system clock is fetched as the generation identifying information which is then stored at a leading address of the resource. An identifier of 64 bits is created which is composed of 32 MSB (more significant bits) corresponding to the address of the resource and 32 LSB (less significant bits) corresponding to the generation identifying information.

For making access to the resource, the generation identifying information is extracted from the identifier transferred as the argument of the system call from the user application to the operating system, wherein the extracted generation identifying information is compared with the generation identifying information stored at the leading or starting address of the resource. When this comparison results in coincidence, the access to the resource is enabled, i.e., allowed. On the contrary, when the comparison shows discrepancy, the access to the resource is disabled or inhibited with an error message being returned.

§3.2. System Utilizing Counter

When the system is activated, a single 32-bit counter is generated in the system for counting the number of times which resources are generated, and an initial value "0" is inputted to the counter as the generation identifying information.

Upon creation of a resource, the above-mentioned generation identifying information is incremented by one and stored at the starting or leading address of the resource. Subsequently, a 64-bit identifier is created which includes more significant 32 bits corresponding to the address of the resource and less significant 32 bits corresponding to the generation identifying information.

For accessing the resource, the resource access processing is performed by using the identifier mentioned above similarly to the processing described in the section §3.1.

Further, the resource accessing methods described above by reference to FIGS. 17A to 23 allow to structure a safe system which inhibits or disables the invalid access to the shared resource by applying the accessing method to the processing steps 1302 and 1306 shown in FIG. 7. This shared resource accessing method will be described below.

For the shared resource allocation, the processing illustrated in FIG. 19 is executed for effecting the shared resource allocation. At that time, the identifier assigned to the shared resource is held to check the validity of the shared resource by using this identifier upon access to the shared resource.

Next, a shared resource accessing method will be described below.

When the processings 1302 and 1306 shown in FIG. 7 are executed for carrying out the shared resource access processing, processing illustrated in FIG. 23 is executed for validating the access to the shared resource. At first, before making access to the shared resource, the generation identifying information (602 in FIG. 17A) stored in the identifier is compared with the generation identifying information (609 in FIG. 17A) of the shared resource (step 2702 in FIG. 23).

When coincidence is found between both the generation identifying information, it is then decided that the identifier of the shared resource is valid, i.e., the resource address (601 in FIG. 17A) contained in the identifier is valid. Accordingly, access is made to the shared resource by using the resource address to perform the processing for the shared resource.

On the contrary, when discrepancy is found between both the generation identifying information mentioned above, this means that the identifier of the shared resource is invalid. More specifically, assuming, by way of example, that discrepancy of the generation identifying information occurs in the processing step 1306 shown in FIG. 7, this means that the shared resource is deallocated for some reason during the preempt-enable interval intervening between the release of the preempt disabled-state (step 1303 in FIG. 7) in succession to the completion of the processing 1302 shown in FIG. 7 and the next preempt disabling (step 1305 in FIG. 7). Thus, the address of the resource (shared resource) as contained in the identifier is invalid. Consequently, the access to the shared resource is suspended and an error processing (step 2703 in FIG. 23) is carried out. In the error processing, the preempt disabling or inhibition and/or abort disabling may be cleared as occasion requires.

Owing to the processing method described above, deallocating of the shared resource carried out outside of the preempt-disabled interval can be detected. Besides, the access to the invalid resource which may occur in accompanying the above-mentioned shared resource deallocating can be prevented for thereby protecting the resource from being destroyed. In this way, it is possible to structure a system capable of processing the shared resource with enhanced security even when the preempt enable interval is set in the shared resource processing interval or section.

As will now be appreciated from the foregoing description, according to the teachings of the invention disclosed herein, overhead involved in the translation between the address and the identifier as well as search for checking the presence/absence of the access right can be reduced with the access performance being correspondingly enhanced. Besides, the resource-access disabled interval or section taking place upon completion of the process can be shortened. Additionally, the resource can be protected against destruction due to the illegal access to the resource from the process imparted with no resource access right.

What is claimed is:

1. A method of accessing a single resource in an operating system, comprising the steps of:
   incrementing a counter included in said operating system by a discrete value, upon generation of a resource, and using a counter value as generation identifying information;
   assigning to said resource an identifier composed of address information and the generation identifying information of said resource;
   storing said generation identifying information at a leading location of said resource;
   extracting generation identifying information from an identifier transferred as an argument of a system call issued by one user application for accessing said resource;
   comparing the extracted generation identifying information with the generation identifying information stored in said resource at said leading location; and
   enabling access to said resource when coincidence is found between both of said generation identifying information, while disabling access to said resource when discrepancy is found between both of said generation identifying information,
   wherein a given one of a plurality of processes in said operating system using said resource is executed by:
     acquiring said resource for use by a given one process after disabling abortion and preemption of said given one process;
     clearing said given one process from a preempt-disabled state and disabling preemption of said given one process after processing for said resource;
     clearing said given one process from the preempt-disabled state and from an abort-disabled state after said resource has been deallocated from use by said given one process; and
     executing a forcive termination request issued for said given one process during a period in which said given one process has been in the abort-disabled state.

2. An accessing method according to claim 1, wherein said generation identifying information corresponds to a time said resource was generated.

3. An accessing method according to claim 1, wherein said identifier corresponds to a 64-bit identifier containing a 32 most significant bits which indicates the address of said resource and a 32 least significant bits which indicates the generation identifying information.

4. An accessing method according to claim 1, further comprising:
   when said coincidence is found between both the generation identifying information, determining that said identifier of said resource is valid and enabling access to said resource using the resource address to perform the processing of said resource; and
   when said discrepancy is found between both the generation identifying information, determining that said identifier of said resource is invalid and disabling access to said resource.

5. An accessing method according to claim 4, wherein said identifier corresponds to a 64-bit identifier containing a 32 most significant bits which indicates the address of said resource and a 32 least significant bits which indicates the generation identifying information.

6. An accessing method according to claim 5, wherein said generation identifying information contains leading 16 bits representing said count value of said counter and trailing 16 bits representing a process identifier.

7. An accessing method according to claim 4, wherein said counter records the number of times said resource is generated, and is set to an initial value of zero and incremented by one each time said resource is generated.

8. A method according to claim 1, further comprising:
   providing a queue for use of said resource for registering those processes issued respective requests;
   executing in a multiprocessing environment a leading one of the processes registered in said queue and issued respective requests for use of said resource; and
   driving periodically processing relating to said process after completion of execution and executing serially the processes registered in said queue.

9. A method for controlling access to a shared resource in an operating system from different processes, comprising the steps of:
   incrementing a counter by a discrete value each time a shared resource is requested from a user application for recording a number of times said shared resource is requested from said user application;
   assigning to said shared resource requested, a resource identifier comprised of a resource address and generation identifying information assigned to said shared resource;
   storing said generation identifying information of said resource identifier at a designated location of said shared resource;
   extracting generation identifying information from a resource identifier transferred as an argument of a system call issued by said user application request for accessing said shared resource;
   making a comparison between the extracted generation identifying information with the generation identifying information stored at said designated location of said shared resource; and
   controlling access to said shared resource in response to said comparison,
   wherein a given one of different processes in said operating system using said shared resource is executed by:
     acquiring said shared resource for use by a given one process after disabling abortion and preemption of said given one process;
     clearing said given one process from a preempt-disabled state and disabling preemption of said given one process after processing for said shared resource;
     clearing said given one process from the preempt-disabled state and from an abort-disabled state after said shared resource has been deallocated from use by said given one process; and
     executing a forcive termination request issued for said given one process during a period in which said given one process has been in the abort-disabled state.

10. A method according to claim 9, further comprising:
    enabling access to said shared resource when the extracted generation identifying information matches the generation identifying information stored at said designated location of said shared resource; and
    disabling access to said shared resource when the extracted generation identifying information does not match the generation identifying information stored at said designated location of said shared resource.

11. A method according to claim 10, wherein said shared identifier corresponds to a 64-bit identifier containing a 32 most significant bits which indicates the address of said shared resource and a 32 least significant bits which indicates the generation identifying information.

12. A method according to claim 10, wherein said generation identifying information contains leading 16 bits representing a count value of said counter and trailing 16 bits representing a process identifier.

13. A method according to claim 9, further comprising:

when the extracted generation identifying information matches the generation identifying information stored at said designated location of said shared resource, determining that said resource identifier of said shared resource is valid and enabling access to said shared resource using the resource address to perform the processing of said shared resource; and when the extracted generation identifying information does not match the generation identifying information stored at said designated location of said shared resource, determining that said resource identifier of said shared resource is invalid and disabling access to said shared resource.

14. A method according to claim 13, wherein said resource identifier corresponds to a 64-bit identifier containing a 32 most significant bits which indicates the address of said shared resource and a 32 least significant bits which indicates the generation identifying information.

15. A method according to claim 14, wherein said generation identifying information contains leading 16 bits representing a count value of said counter and trailing 16 bits representing a process identifier.

16. A method according to claim 9, wherein said counter records the number of times said shared resource is requested, and is set to an initial value of zero and incremented by one each time said shared resource is requested.

17. A method according to claim 15, wherein said counter records the number of times said shared resource is requested, and is set to an initial value of zero and incremented by one each time said shared resource is requested.

18. A method according to claim 9, further comprising:

providing a queue for use of said shared resource for registering those processes issued respective requests;

executing in a multiprocessing environment a leading one of the processes registered in said queue and issued respective requests for use of said shared resource; and driving periodically processing relating to said process after completion of execution and executing serially the processes registered in said queue.

* * * * *